United States Patent
Back et al.

(10) Patent No.: US 12,471,178 B2
(45) Date of Patent: Nov. 11, 2025

(54) METHOD AND DEVICE FOR RESOURCE ALLOCATION IN WIRELESS COMMUNICATION SYSTEM

(71) Applicant: LG Electronics Inc., Seoul (KR)

(72) Inventors: Seoyoung Back, Seoul (KR); Giwon Park, Seoul (KR); Seungmin Lee, Seoul (KR); Jongwoo Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 295 days.

(21) Appl. No.: 18/258,085

(22) PCT Filed: Jan. 18, 2022

(86) PCT No.: PCT/KR2022/000929
§ 371 (c)(1),
(2) Date: Jun. 16, 2023

(87) PCT Pub. No.: WO2022/158830
PCT Pub. Date: Jul. 28, 2022

(65) Prior Publication Data
US 2024/0049343 A1 Feb. 8, 2024

Related U.S. Application Data

(60) Provisional application No. 63/140,267, filed on Jan. 22, 2021.

(51) Int. Cl.
*H04W 76/28* (2018.01)
(52) U.S. Cl.
CPC .................. *H04W 76/28* (2018.02)

(58) Field of Classification Search
CPC ..... H04W 76/28; H04W 72/25; H04W 92/18; H04W 4/40; H04W 72/40; H04W 72/02;
(Continued)

(56) References Cited

U.S. PATENT DOCUMENTS

2022/0225466 A1* 7/2022 Wang ............... H04W 72/23
2022/0369417 A1 11/2022 Park et al.
(Continued)

FOREIGN PATENT DOCUMENTS

| CN | 106961732 B | 6/2020 |
|---|---|---|
| WO | WO 2020/218892 A1 | 10/2020 |
| WO | WO 2021/002723 A1 | 1/2021 |

OTHER PUBLICATIONS

Extended European Search Report in European Appln. No. 22742806.7, mailed on Jun. 20, 2024, 9 pages.
(Continued)

*Primary Examiner* — Jae Y Lee
(74) *Attorney, Agent, or Firm* — Fish & Richardson P.C.

(57) ABSTRACT

A first UE of the present disclosure identifies a first resource for first data and a second resource for second data, transmits, to a second UE, the first data on the basis of control information for allocating the first resource and the first resource, the control information not including reservation information about the second resource notifying of the location of the second resource on the basis of the time interval between the first resource and the second resource being larger than the time interval permitted for the resource reservation, identifies a third resource for the second data in the activation section of a DRX cycle of the second UE, and transmits, to the second UE, the second data on the basis of control information for allocating the third resource and the third resource.

15 Claims, 21 Drawing Sheets

(58) Field of Classification Search
CPC ... H04W 72/0446; H04W 76/14; Y02D 30/70
See application file for complete search history.

(56) References Cited

U.S. PATENT DOCUMENTS

| | | | | |
|---|---|---|---|---|
| 2023/0247718 A1* | 8/2023 | Ji | ...................... | H04W 72/0446 |
| 2023/0363052 A1* | 11/2023 | Lee | ...................... | H04W 76/28 |
| 2024/0214940 A1* | 6/2024 | Zhang | ............... | H04W 52/0229 |

OTHER PUBLICATIONS

Intel Corporation, "Design of UE Sidelink Power Saving Solutions," R1-2100672, 3GPP TSG RAN WG1, Meeting #104-E, E-meeting, Jan. 25-Feb. 5, 2021, 19 pages.
InterDigital, Inc., "Sidelink resource allocation for power saving," R1-2100981, 3GPP TSG RAN WG1, #104-e, E-meeting, Jan. 25-Feb. 5, 2021, 6 pages.
International Search Report and Written Opinion in International Appln. No. PCT/KR2022/000929, mailed on Apr. 25, 2022, 14 pages (with English translation).
Vivo, "Resource allocation for sidelink power saving," R1-2100466, 3GPP TSG RAN WG1, #104-e, E-meeting, Jan. 25-Feb. 5, 2021, 14 pages.

\* cited by examiner

METHOD AND DEVICE FOR RESOURCE ALLOCATION IN WIRELESS COMMUNICATION SYSTEM

CROSS-REFERENCE TO RELATED APPLICATIONS

This application is a National Stage application under 35 U.S.C. § 371 of International Application No. PCT/KR2022/000929, filed on Jan. 18, 2022, which claims the benefit of U.S. Provisional Application No. 63/140,267, filed on Jan. 22, 2021. The disclosures of the prior applications are incorporated by reference in their entirety.

TECHNICAL FIELD

The present disclosure relates to a resource allocation in a wireless communication system.

BACKGROUND

A wireless communication system is a multiple access system that supports communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency (SC-FDMA) system. There is a division multiple access (MC-FDMA) system and a multi carrier frequency division multiple access (MC-FDMA) system.

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include basic vehicle information such as vehicle dynamic state information such as direction and speed, vehicle static data such as dimensions, external lighting conditions, and route details. For example, the UE may broadcast CAM, and the latency of CAM may be less than 100 ms. For example, when an unexpected situation such as a vehicle breakdown or an accident occurs, a UE may generate a DENM and transmit it to another UE. For example, all vehicles within the transmission range of the UE can receive CAM and/or DENM. In this case, DENM may have a higher priority than CAM.

Thereafter, regarding V2X communication, various V2X scenarios are proposed in NR. For example, the various V2X scenarios may include vehicle platooning, advanced driving, extended sensors, remote driving, or the like.

For example, based on vehicle platooning, vehicles can dynamically form groups and move together. For example, to perform platoon operations based on vehicle platooning, vehicles belonging to the group may receive periodic data from the lead vehicle. For example, vehicles belonging to the group may shorten or widen the distance between vehicles using periodic data.

For example, based on enhanced driving, vehicles can be semi-automated or fully automated. For example, each vehicle may adjust trajectories or maneuvers based on data obtained from local sensors of proximate vehicles and/or proximate logical entities. Also, for example, each vehicle may mutually share driving intention with nearby vehicles.

For example, based on extended sensors, raw data or processed data obtained through local sensors, or live video data may be used for vehicles, logical entities, UEs of pedestrians, and/or may be interchanged between V2X application servers. Thus, for example, a vehicle can recognize an environment that is more advanced than an environment that can be sensed using its own sensors.

For example, based on remote driving, for a person who cannot drive or a remote vehicle located in a dangerous environment, a remote driver or V2X application may operate or control the remote vehicle. For example, when a route can be predicted, such as in public transportation, cloud computing-based driving may be used to operate or control the remote vehicle. Also, for example, access to a cloud-based back-end service platform can be considered for remote driving.

Meanwhile, ways to specify service requirements for various V2X scenarios, such as vehicle platooning, enhanced driving, extended sensors, and remote driving, are being discussed in NR-based V2X communication.

In a wireless communication system, a base station allocates resources to a UE, and the UE may perform transmission related to the UE (e.g., transmission by the UE and/or transmission to the UE) using the allocated resources. Furthermore, in the sidelink, the first UE allocates resources to the second UE, and the second UE may perform transmission related to the second UE (e.g., transmission by the second UE and/or transmission to the second UE) using the allocated resource. Resource allocation for the second UE may be performed even when the second UE performs a DRX operation.

SUMMARY

The present disclosure provides a method and apparatus for resource allocation in a wireless communication system.

The present disclosure provides a method and apparatus for resource allocation in a sidelink in a wireless communication system.

The present disclosure provides a method and apparatus for resource allocation to a UE performing a DRX operation in a sidelink in a wireless communication system.

According to an embodiment of the present disclosure, a method performed by a first user equipment (UE) in a wireless communication system comprises: identifying a first resource for first data and a second resource for second data; transmitting, to a second UE, control information for allocating the first resource and the first data based on the first resource, wherein the control information does not include reservation information for the second resource indicating a location of the second resource based on a time interval between the first resource and the second resource being greater than a time interval allowed for resource reservation; identifying a third resource for the second data in an active time of a discontinuous reception (DRX) cycle of the second UE based on the control information not including the reservation information for the second resource; and transmitting, to the second UE, control information for allocating the third resource and the second data based on the third resource.

According to an embodiment of the present disclosure, a first user equipment (UE) in a wireless communication system comprises: a transceiver; a memory; and at least one processor operatively coupled to the transceiver and the memory, wherein the at least one processor is configured to: identify a first resource for first data and a second resource for second data; control the transceiver to transmit, to a second UE, control information for allocating the first resource and the first data based on the first resource, wherein the control information does not include reservation information for the second resource indicating a location of the second resource based on a time interval between the first resource and the second resource being greater than a time interval allowed for resource reservation; identify a third resource for the second data in an active time of a discontinuous reception (DRX) cycle of the second UE based on the control information not including the reservation information for the second resource; and control the transceiver to transmit, to the second UE, control information for allocating the third resource and the second data based on the third resource.

According to an embodiment of the present disclosure, a non-transitory computer readable medium has stored thereon a plurality of instructions that, when executed by a processor of a first user equipment (UE), perform operations comprising: identifying a first resource for first data and a second resource for second data; transmitting, to a second UE, control information for allocating the first resource and the first data based on the first resource, wherein the control information does not include reservation information for the second resource indicating a location of the second resource based on a time interval between the first resource and the second resource being greater than a time interval allowed for resource reservation; identifying a third resource for the second data in an active time of a discontinuous reception (DRX) cycle of the second UE based on the control information not including the reservation information for the second resource; and transmitting, to the second UE, control information for allocating the third resource and the second data based on the third resource.

According to an embodiment of the present disclosure, a memory of a processor for a first user equipment (UE) in a wireless communication system stores a software code implementing instructions that, when executed by the processor, perform operations comprising: identifying a first resource for first data and a second resource for second data; transmitting, to a second UE, control information for allocating the first resource and the first data based on the first resource, wherein the control information does not include reservation information for the second resource indicating a location of the second resource based on a time interval between the first resource and the second resource being greater than a time interval allowed for resource reservation; identifying a third resource for the second data in an active time of a discontinuous reception (DRX) cycle of the second UE based on the control information not including the reservation information for the second resource; and transmitting, to the second UE, control information for allocating the third resource and the second data based on the third resource.

According to an embodiment of the present disclosure, a method performed by a base station (BS) in a wireless communication system comprises: allocating a first resource and a second resource used for a transmission by a first user equipment (UE) to a second UE; transmitting control information for scheduling the first resource and control information for scheduling the second resource to the first UE; receiving, from the first UE, a resource request for requesting a resource used for the first UE to transmit to the second UE based on a time interval between the first resource and the second resource being greater than a time interval allowed for resource reservation; allocating a third resource used for a transmission by the first UE to the second UE in an active time of a discontinuous reception (DRX) cycle of the second UE based on the resource request; and transmitting control information for scheduling the third resource to the first UE.

According to an embodiment of the present disclosure, a base station (BS) in a wireless communication system comprises: a transceiver; a memory; and at least one processor operatively coupled to the transceiver and the memory, wherein the at least one processor is configured to control the transceiver to: allocate a first resource and a second resource used for a transmission by a first user equipment (UE) to a second UE; control the transceiver to transmit control information for scheduling the first resource and control information for scheduling the second resource to the first UE; control the transceiver to receive, from the first UE, a resource request for requesting a resource used for the first UE to transmit to the second UE based on a time interval between the first resource and the second resource being greater than a time interval allowed for resource reservation; allocate a third resource used for a transmission by the first UE to the second UE in an active time of a discontinuous reception (DRX) cycle of the second UE based on the resource request; and control the transceiver to transmit control information for scheduling the third resource to the first UE.

The present disclosure may have various effects.

For example, even if the RX UE fails to receive data on the next transmission resource due to the time interval between the previous transmission resource and the next transmission resource being greater than the time interval allowed for resource reservation (e.g. 32 slots), the TX UE allocates resources again in DRX ON duration of RX UE, thereby it is possible to ensure that scheduling for RX is not interrupted.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
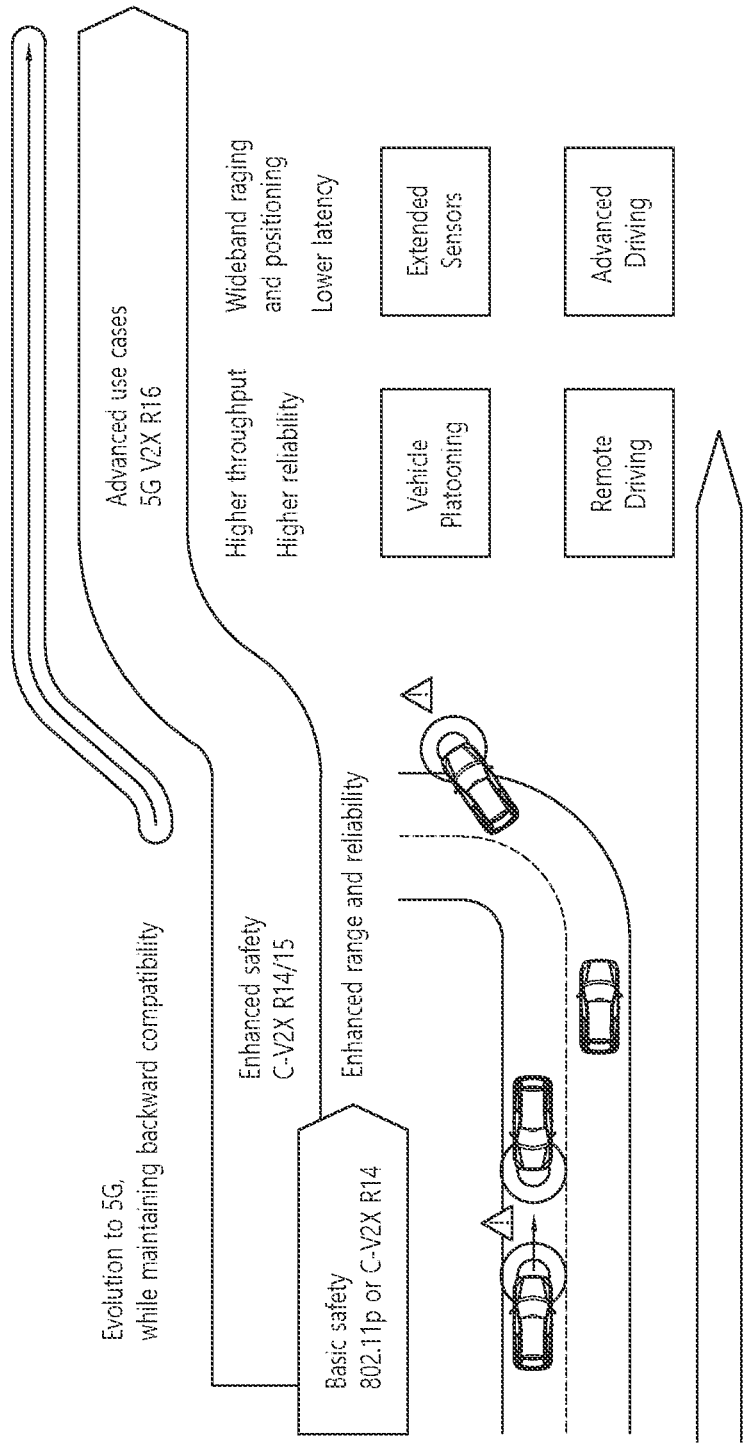
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
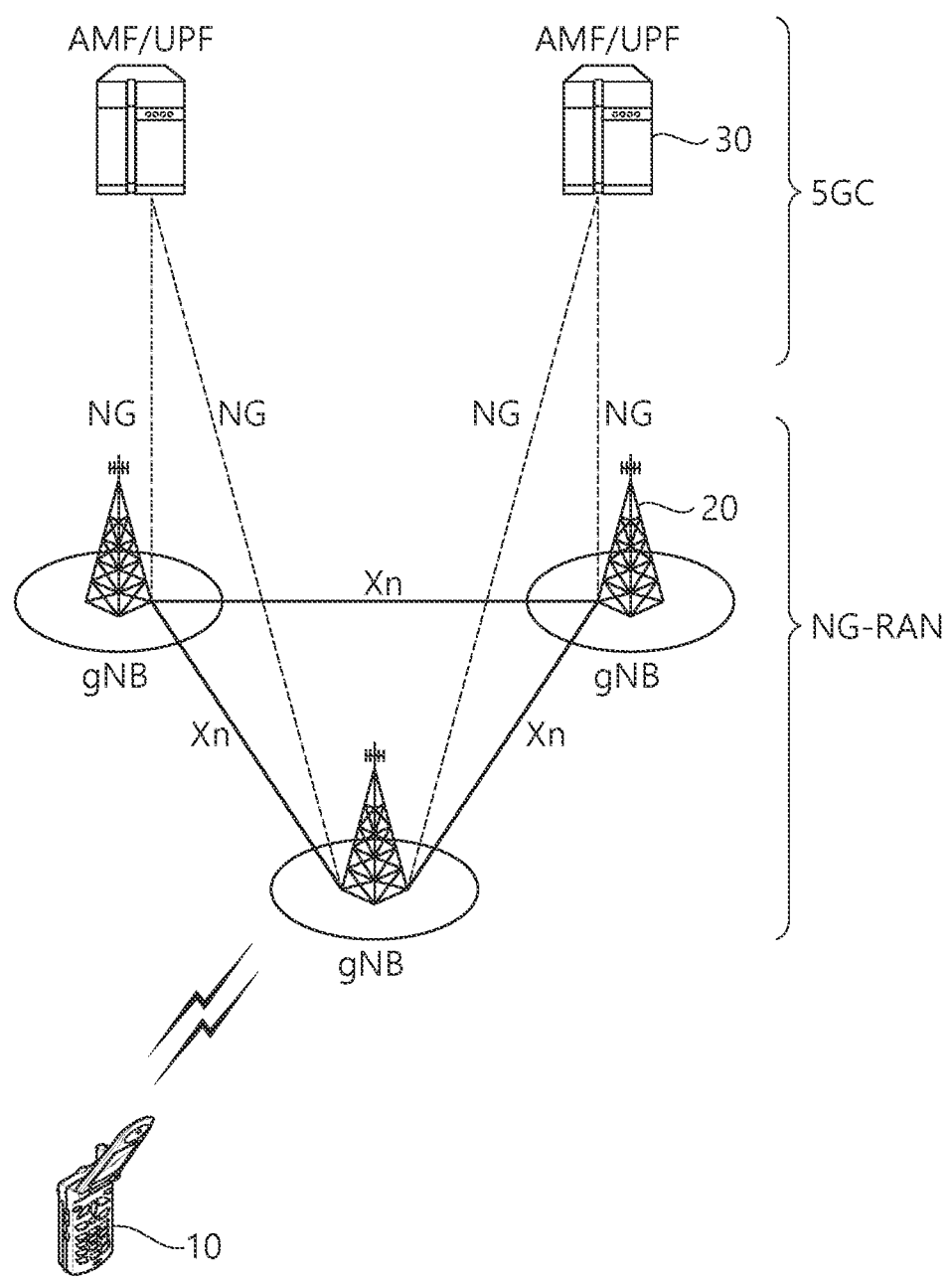
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
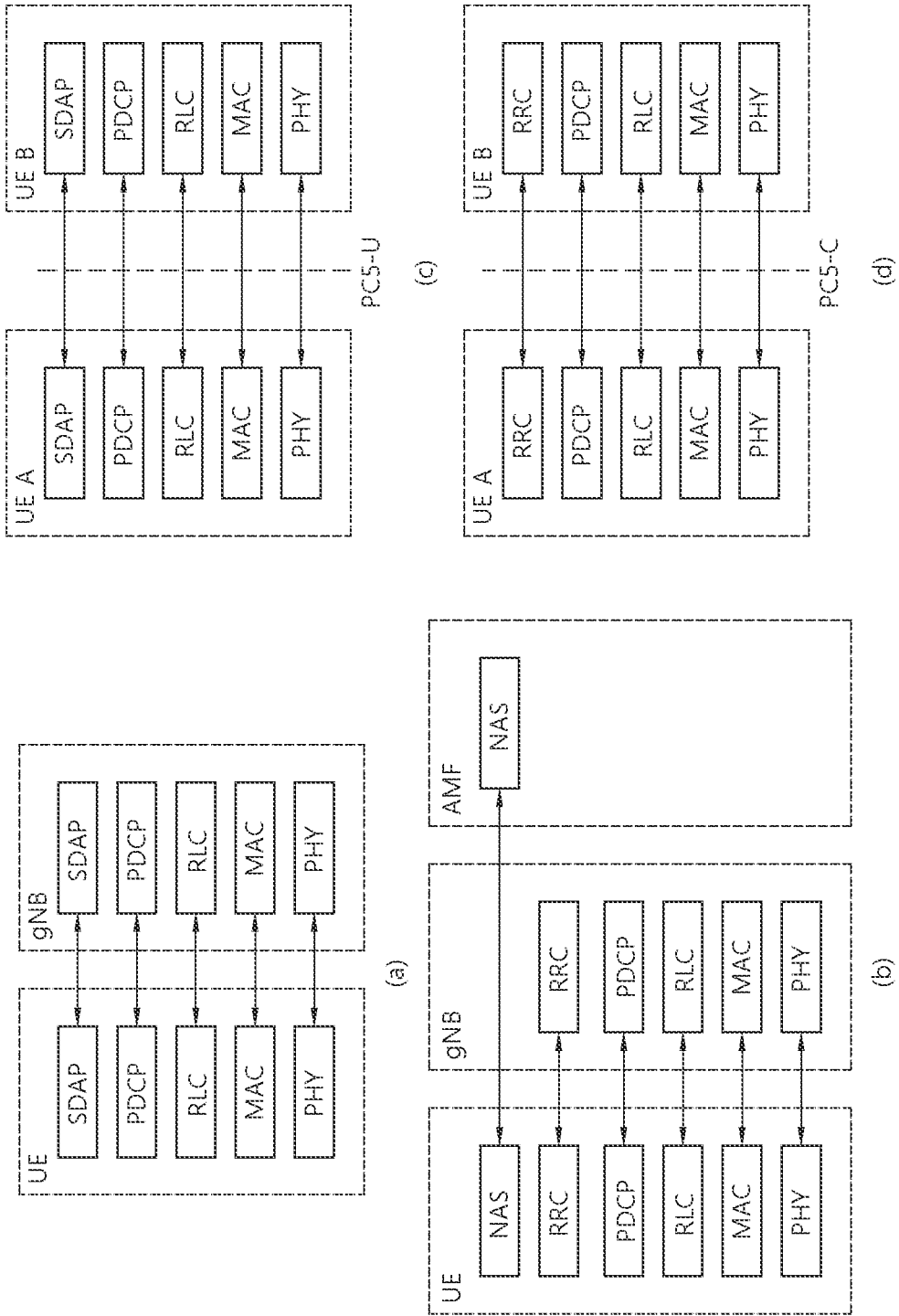
FIG. 3 shows a radio protocol architecture, in accordance with an embodiment of the present disclosure.

FIG. 3 shows a radio protocol architecture, in accordance with an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
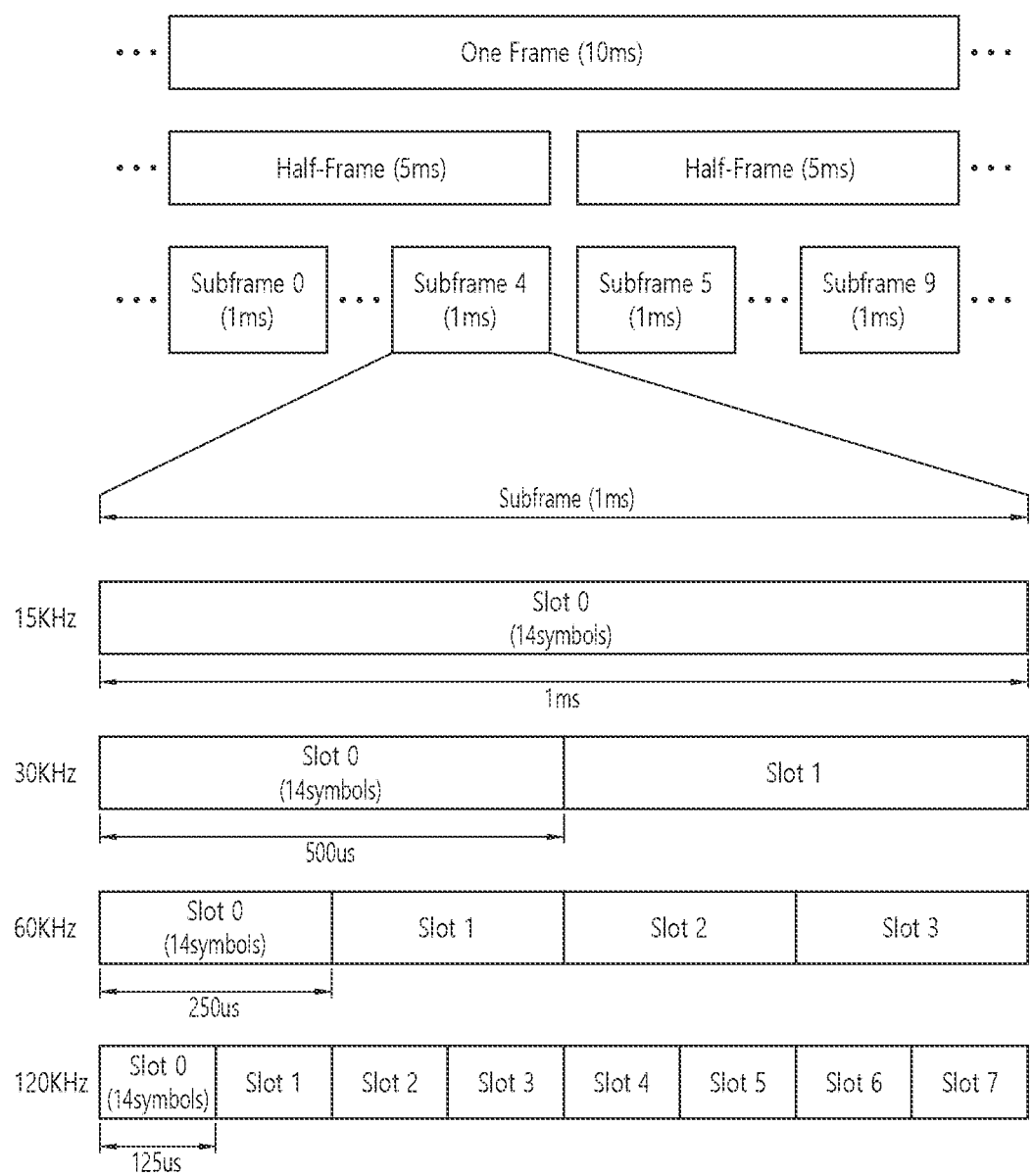
FIG. 4 shows a structure of a radio frame of an NR, in accordance with an embodiment of the present disclosure.

FIG. 4 shows a structure of a radio frame of an NR, in accordance with an embodiment of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells. In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
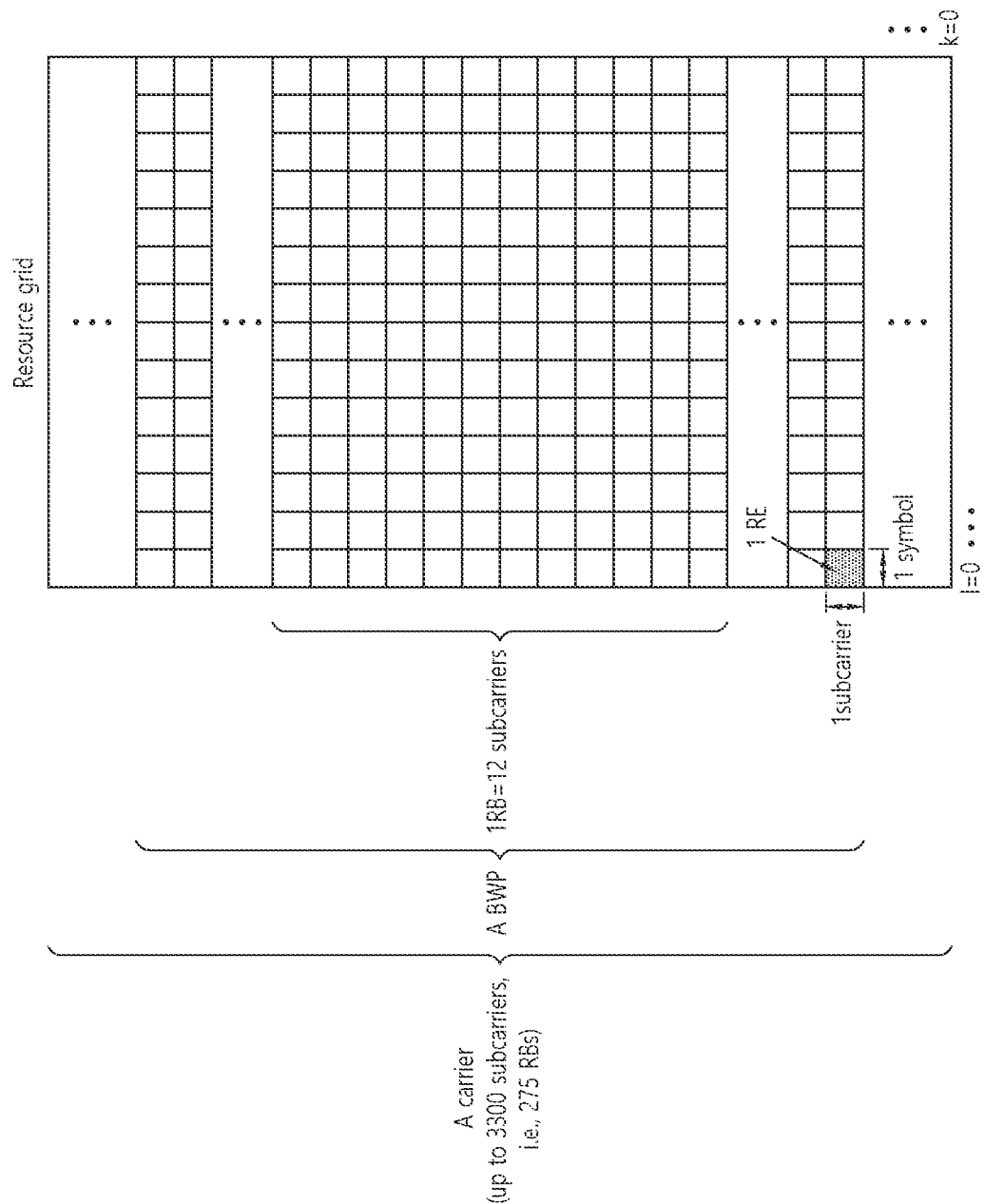
FIG. 5 shows a structure of a slot of an NR frame, in accordance with an embodiment of the present disclosure.

FIG. 5 shows a structure of a slot of an NR frame, in accordance with an embodiment of the present disclosure. Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and a UE or a radio interface between a UE and a network may be comprise a first layer, an L2 layer, and an L3 layer. In various embodiments of the present disclosure, layer 1 may mean a physical layer. Also, for example, the L2 layer may mean at least one of a MAC layer, an RLC layer, a PDCP layer, or an SDAP layer. Also, for example, the L3 layer may mean an RRC layer.

Hereinafter, V2X or SL communication will be described.

Figure 6:
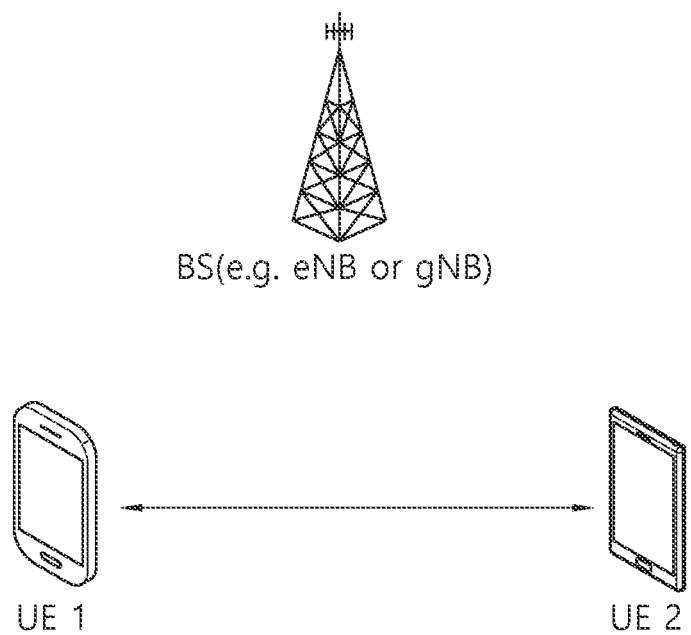
FIG. 6 shows an example of a BWP, in accordance with an embodiment of the present disclosure.

FIG. 6 shows a UE performing V2X or SL communication, in accordance with an embodiment of the present disclosure. The embodiment of FIG. 6 may be combined with various embodiments of the present disclosure.

Referring to FIG. 6, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Resource pools can be subdivided into several types. For example, according to the content of the SL signal transmitted in each resource pool, the resource pool may be classified as follows.

(1) Scheduling Assignment (SA) may be a signal comprising information such as a location of the resource used by the transmitting UE for transmission of the SL data channel, MCS (Modulation and Coding Scheme) required for demodulation of data channels or MIMO (Multiple Input Multiple Output) transmission scheme, TA (Timing Advance). SA can also be multiplexed and transmitted together with SL data on the same resource unit. In this case, the SA resource pool may mean a resource pool in which SA is multiplexed with SL data and transmitted. SA may also be referred to as an SL control channel.

(2) SL data channel (Physical Sidelink Shared Channel, PSSCH) may be a resource pool used by a transmitting UE to transmit user data. If SA is multiplexed and transmitted together with SL data on the same resource unit, only the SL data channel in a form excluding SA information can be transmitted in the resource pool for the SL data channel. In other words, Resource Elements (REs) used to transmit SA information on separate resource units in the SA resource pool may still be used to transmit SL data in the resource pool of the SL data channel. For example, the transmitting UE may transmit the PSSCH by mapping it to consecutive PRBs.

(3) A discovery channel may be a resource pool for a transmitting UE to transmit a discovery message comprising information such as its own ID. Through this, the transmitting UE can allow neighbour UEs to discover themselves.

Even when the contents of the SL signals described above are the same, different resource pools may be used according to transmission/reception properties of the SL signals. For example, even for the same SL data channel or discovery message, depending on a method for determining the transmission timing of the SL signal (e.g., whether it is transmitted at the reception time of the synchronization reference signal or transmitted by applying a certain timing advance at the reception time), resource allocation method (e.g., whether the base station assigns separate signal transmission resources to separate transmission UEs or whether separate transmission UEs select separate signal transmission resources within the resource pool), signal format (e.g., the number of symbols occupied by each SL signal in one subframe, or the number of subframes used for transmission of one SL signal), signal strength from a base station, transmit power strength of an SL UE, etc., resource pools may be divided into different resource pools.

UE 2 may perform indirect communication with the base station through UE 1. Such indirect communication may be performed through an access link (or Uu link) between UE 1 and the base station and a sidelink between UE 1 and UE 2. UE 1 may relay signal transmission between the base station and UE 2. In this case, UE 1 may be referred to as a relay UE, and UE 2 may be referred to as a remote UE. A connection that UE 2 establishes with UE 1 and/or a base station to perform indirect communication may be referred to as an indirect connection.

For example, the remote UE may be within the connection range (in-coverage) of the base station. In this case, the remote UE may be within the connection range of the same base station as the relay UE or may be within the connection range of different base station.

As another example, the remote UE may be outside the connection range of the base station (out-of-coverage).

On the other hand, UE 2 may perform direct communication with the base station without relaying of UE 1. Such direct communication may be performed through an access link (or Uu link) between UE 2 and the base station. A connection that UE 2 establishes with a base station to perform direct communication may be referred to as a direct connection.

For synchronization between UE 1 and UE 2, one UE may transmit a Sidelink Synchronization Signal (SLSS) to another UE. The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Meanwhile, in the NR SL system, a plurality of numerologies having different SCS and/or CP lengths may be supported. In this case, as the SCS increases, the length of time resources through which the transmitting UE transmits the S-SSB may be shortened. Accordingly, coverage of the S-SSB may decrease. Therefore, in order to guarantee coverage of the S-SSB, the transmitting UE may transmit one or more S-SSBs to the receiving UE within one S-SSB transmissiON duration according to the SCS. For example, the number of S-SSBs that the transmitting UE transmits to the receiving UE within one S-SSB transmissiON duration may be pre-configured or configured for the transmitting UE. For example, the S-SSB transmissiON duration may be 160 ms. For example, for all SCSs, an S-SSB transmissiON duration of 160 ms may be supported.

For example, when the SCS is 15 kHz in FR1, the transmitting UE may transmit one or two S-SSBs to the receiving UE within one S-SSB transmissiON duration. For example, when the SCS is 30 kHz in FR1, the transmitting UE may transmit one or two S-SSBs to the receiving UE within one S-SSB transmissiON duration. For example, when the SCS is 60 kHz in FR1, the transmitting UE may transmit one, two or four S-SSBs to the receiving UE within one S-SSB transmissiON duration.

For example, when the SCS is 60 kHz in FR2, the transmitting UE can transmit 1, 2, 4, 8, 16 or 32 S-SSBs to the receiving UE within one S-SSB transmissiON duration. there is. For example, if the SCS is 120 kHz in FR2, the transmitting UE may transmit 1, 2, 4, 8, 16, 32 or 64 S-SSBs to the receiving UE within one S-SSB transmissiON duration.

Meanwhile, when the SCS is 60 kHz, two types of CPs may be supported. In addition, the structure of the S-SSB transmitted from the transmitting UE to the receiving UE may be different according to the CP type. For example, the CP type may be Normal CP (NCP) or Extended CP (ECP). Specifically, for example, when the CP type is NCP, the number of symbols mapped to the PSBCH in the S-SSB transmitted by the transmitting UE may be 9 or 8. On the other hand, for example, when the CP type is ECP, the number of symbols mapped to the PSBCH in the S-SSB transmitted by the transmitting UE may be 7 or 6. For example, a PSBCH may be mapped to a first symbol in an S-SSB transmitted by a transmitting UE. For example, a receiving UE receiving the S-SSB may perform an automatic gain control (AGC) operation in the first symbol interval of the S-SSB.

Hereinafter, resource allocation in SL will be described.

Figure 7:
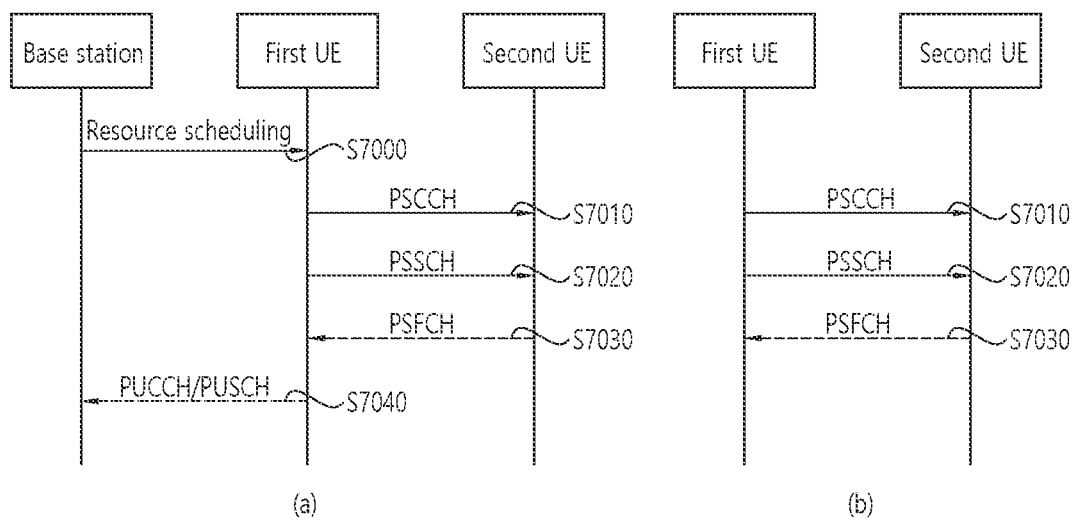
FIG. 7 shows a procedure of performing V2X or SL communication by a UE based on a transmission mode, in accordance with an embodiment of the present disclosure.

FIG. 7 shows a procedure of performing V2X or SL communication by a UE based on a transmission mode, in accordance with an embodiment of the present disclosure. The embodiment of FIG. 7 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 7 shows a UE operation related to an LTE transmission mode 1 or an LTE transmission mode 3. Alternatively, for example, (a) of FIG. 7 shows a UE operation related to an NR resource allocation mode 1. For example, the LTE transmission mode 1 may be applied to general SL communication, and the LTE transmission mode 3 may be applied to V2X communication.

For example, (b) of FIG. 7 shows a UE operation related to an LTE transmission mode 2 or an LTE transmission mode 4. Alternatively, for example, (b) of FIG. 7 shows a UE operation related to an NR resource allocation mode 2.

Referring to (a) of FIG. 7, in the LTE transmission mode 1, the LTE transmission mode 3, or the NR resource allocation mode 1, a BS may schedule an SL resource to be used by the UE for SL transmission. For example, in step S7000, the base station may transmit information related to SL resources and/or information related to UL resources to the first UE. For example, the UL resource may include a PUCCH resource and/or a PUSCH resource. For example, the UL resource may be a resource for reporting SL HARQ feedback to the base station.

For example, the first UE may receive information related to dynamic grant (DG) resources and/or information related to configured grant (CG) resources from the base station. For example, CG resources may include CG type 1 resources or CG type 2 resources. In this specification, the DG resource may be a resource configured/allocated by the base station to the first UE through downlink control information (DCI). In this specification, the CG resource may be a (periodic) resource configured/allocated by the base station to the first UE through a DCI and/or RRC message. For example, in the case of a CG type 1 resource, the base station may transmit an RRC message including information related to the CG resource to the first UE. For example, in the case of a CG type 2 resource, the base station may transmit an RRC message including information related to the CG resource to the first UE, and the base station may transmit a DCI related to activation or release of the CG resource to the first UE.

In step S7010, the first UE may transmit a PSCCH (e.g., Sidelink Control Information (SCI) or 1st-stage SCI) to the second UE based on the resource scheduling. In step S7020, the first UE may transmit a PSSCH (e.g., 2nd-stage SCI, MAC PDU, data, etc.) related to the PSCCH to the second UE. In step S7030, the first UE may receive the PSFCH related to the PSCCH/PSSCH from the second UE. For example, HARQ feedback information (e.g., NACK information or ACK information) may be received from the second UE through the PSFCH. In step S7040, the first UE may transmit/report HARQ feedback information to the base station through PUCCH or PUSCH. For example, the HARQ feedback information reported to the base station may be information that the first UE generates based on the HARQ feedback information received from the second UE. For example, the HARQ feedback information reported to the base station may be information generated by the first UE based on a rule configured in advance. For example, the DCI may be a DCI for SL scheduling. For example, the format of the DCI may be DCI format 3_0 or DCI format 3_1.

Referring to (b) of FIG. 7, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. For example, in step S7010, the first UE that has selected a resource within the resource pool can transmit a PSCCH (e.g., Sidelink Control Information (SCI) or 1st-stage SCI) to the second UE using the resource. In step S7020, the first UE may transmit a PSSCH (e.g., 2nd-stage SCI, MAC PDU, data, etc.) related to the PSCCH to the second UE. In step S7030, the first UE may receive the PSFCH related to the PSCCH/PSSCH from the second UE.

Referring to (a) or (b) of FIG. 7, for example, UE 1 may transmit SCI to UE 2 on PSCCH. Alternatively, for example, UE 1 may transmit two consecutive SCI (e.g., 2-stage SCI) to UE 2 on PSCCH and/or PSSCH. In this case, UE 2 may decode two consecutive SCIs (e.g., 2-stage SCI) in order to receive the PSSCH from UE 1. In this specification, SCI transmitted on PSCCH may be referred to as a 1st SCI, first SCI, 1st-stage SCI or 1st-stage SCI format, and SCI transmitted on PSSCH may be referred to as 2nd SCI, second SCI, 2nd-stage SCI or a 2nd-stage SCI format. For example, the 1st-stage SCI format may include SCI format 1-A, and the 2nd-stage SCI format may include SCI format 2-A and/or SCI format 2-B.

Referring to (a) or (b) of FIG. 7, in step S7030, the first UE may receive the PSFCH. For example, UE 1 and UE 2 may determine a PSFCH resource, and UE 2 may transmit HARQ feedback to UE 1 using the PSFCH resource.

Referring to (a) of FIG. 7, in step S7040, the first UE may transmit SL HARQ feedback to the base station through PUCCH and/or PUSCH.

Hereinafter, a sidelink control information (SCI) will be described.

Control information transmitted by a BS to a UE through a PDCCH may be referred to as downlink control information (DCI), whereas control information transmitted by the UE to another UE through a PSCCH may be referred to as SCI. For example, the UE may know in advance a start symbol of the PSCCH and/or the number of symbols of the PSCCH, before decoding the PSCCH. For example, the SCI may include SL scheduling information. For example, the UE may transmit at least one SCI to another UE to schedule the PSSCH. For example, one or more SCI formats may be defined.

For example, a transmitting UE may transmit the SCI to a receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, if SCI configuration fields are divided into two groups in consideration of a (relatively) high SCI payload size, an SCI including a first SCI configuration field group may be referred to as a first SCI or a 1st SCI, and an SCI including a second SCI configuration field group may be referred to as a second SCI or a 2nd SCI. For example, the transmitting UE may transmit the first SCI to the receiving UE through the PSCCH. For example, the transmitting UE may transmit the second SCI to the receiving UE on the PSCCH and/or the PSSCH. For example, the second SCI may be transmitted to the receiving UE through an (independent) PSCCH, or may be transmitted in a piggyback manner together with data through the PSSCH. For example, two consecutive SCIs may also be applied to different transmissions (e.g., unicast, broadcast, or groupcast).

For example, the transmitting UE may transmit the entirety or part of information described below to the receiving UE through the SCI. Herein, for example, the transmitting UE may transmit the entirety or part of the information described below to the receiving UE through the first SCI and/or the second SCI.

PSSCH and/or PSCCH related resource allocation information, e.g., the number/positions of time/frequency resources, resource reservation information (e.g., period), and/or SL CSI report request indicator or SL (1) RSRP (and/or SL (1) RSRQ and/or SL (LI) RSSI) report request indicator, and/or SL CSI transmission indicator (or SL (1) RSRP (and/or SL (1) RSRQ and/or SL (L1) RSSI) information transmission indicator)) (on PSSCH), and/or MCS information, and/or Transmit power information, and/or 1 destination ID information and/or 1 source ID information, and/or SL HARQ process ID information, and/or New data indicator (NDI) information, and/or Redundancy version (RV) information, and/or (Transmission traffic/packet related) QoS information, e.g., priority information, and/or SL CSI-RS transmission indicator or information on the number of (to-be-transmitted) SL CSI-RS antenna ports, Location information of a transmitting UE or location (or distance region) information of a target receiving UE (for which SL HARQ feedback is requested), and/or Reference signal (e.g., DMRS, etc.) related to channel estimation and/or decoding of data to be transmitted through a PSSCH, e.g., information related to a pattern of a (time-frequency) mapping resource of DMRS, rank information, antenna port index information For example, the first SCI may include information related to channel sensing. For example, the receiving UE may decode the second SCI by using a PSSCH DMRS. A polar code used in a PDCCH may be applied to the second SCI. For example, in a resource pool, a payload size of the first SCI may be identical for unicast, groupcast, and broadcast. After decoding the first SCI, the receiving UE does not have to perform blind decoding of the second SCI. For example, the first SCI may include scheduling information of the second SCI.

Meanwhile, in various embodiments of the present disclosure, since the transmitting UE may transmit at least one of the SCI, the first SCI, and/or the second SCI to the receiving UE through the PSCCH, the PSCCH may be replaced/substituted with at least one of the SCI, the first SCI, and/or the second SCI. And/or, for example, the SCI may be replaced/substituted with at least one of the PSCCH, the first SCI, and/or the second SCI. And/or, for example, since the transmitting UE may transmit the second SCI to the receiving UE through the PSSCH, the PSSCH may be replaced/substituted with the second SCI.

Hereinafter, SL congestion control (sidelink congestion control) will be described.

For example, the terminal determines whether the energy measured in a unit time/frequency resource is equal to or higher than a certain level, and adjusts the amount and frequency of its own transmission resources according to the ratio of unit time/frequency resources in which energy of a certain level or higher is observed. In the present disclosure, a ratio of time/frequency resources in which energy of a certain level or higher is observed may be defined as a channel busy ratio (CBR). The UE may measure the CBR for each channel/frequency. Additionally, the UE may transmit the measured CBR to the network/base station.

Figure 8:
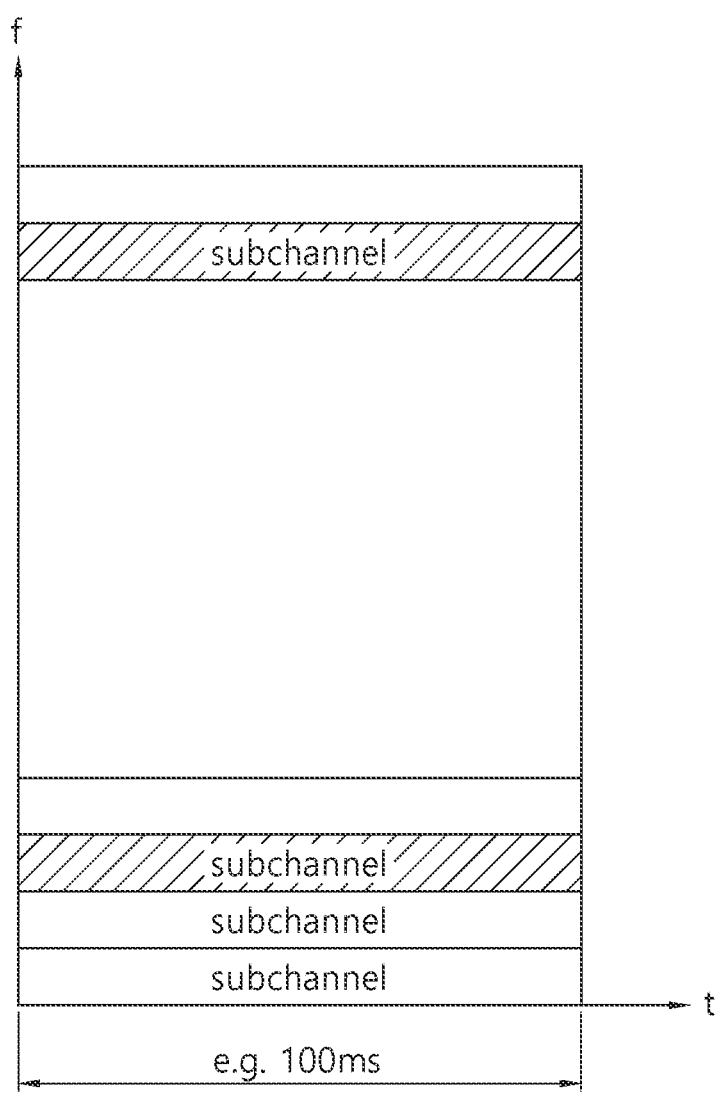
FIG. 8 shows a resource unit for CBR measurement according to an embodiment of
the present disclosure.

FIG. 8 shows a resource unit for CBR measurement according to an embodiment of the present disclosure. The embodiment of FIG. 8 may be combined with various embodiments of the present disclosure.

Referring to FIG. 8, CBR may mean, as a result of the UE measuring RSSI (Received Signal Strength Indicator) in units of subchannels for a specific period (e.g., 100 ms), the number of subchannels for which the RSSI measurement result value is greater than or equal to a preconfigured threshold value. Alternatively, the CBR may mean a ratio of subchannels having a value equal to or greater than a preconfigured threshold among subchannels during a specific period. For example, in the embodiment of FIG. 8, when it is assumed that a subchannel with hatching is a subchannel having a value equal to or greater than a preconfigured threshold, CBR may mean a ratio of hatched subchannels during a period of 100 ms. Additionally, the terminal may report the CBR to the base station.

For example, when the PSCCH and the PSSCH are multiplexed in the frequency domain, the UE can perform one CBR measurement for one resource pool. Here, if a PSFCH resource is configured or previously configured, the PSFCH resource may be excluded from the CBR measurement.

Furthermore, congestion control considering the priority of traffic (e.g., packets) may be required. To this end, for example, the terminal may measure channel occupancy ratio (CR). Specifically, the terminal measures the CBR, and the terminal may determine the maximum value (CRlimitk) of channel occupancy ratio k (CRk) that traffic corresponding to each priority (e.g., k) can occupy according to the CBR. For example, the terminal may derive the maximum value (CRlimitk) of the channel occupancy for the priority of each traffic based on a predetermined table of CBR measurement values. For example, in the case of traffic having a relatively high priority, the terminal may derive a maximum value of a relatively large channel occupancy. Thereafter, the UE may perform congestion control by limiting the sum of channel occupancy rates of traffics whose priority k is lower than i to a predetermined value or less. According to this method, a stronger channel occupancy limit may be applied to traffic having a relatively lower priority.

In addition, the terminal may perform SL congestion control using methods such as transmission power size adjustment, packet drop, retransmission decision, and transmission RB size adjustment (MCS adjustment).

Figure 9:
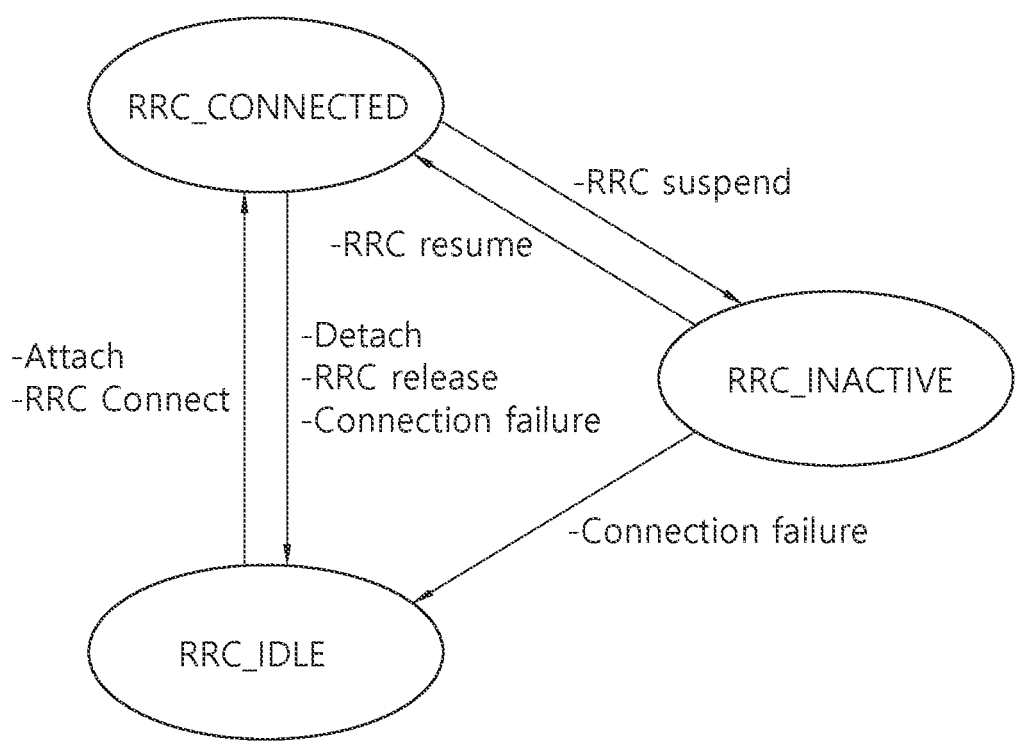
FIG. 9 shows an example of possible RRC states in a wireless communication system according to an embodiment of the present disclosure.

FIG. 9 shows an example of possible RRC states in a wireless communication system according to an embodiment of the present disclosure.

Referring to FIG. 9, three possible RRC states may exist in a wireless communication system. The three possible RRC states may include idle mode/state (i.e., RRC_IDLE), connected mode/state (i.e., RRC_CONNECTED) and/or inactive mode/state (i.e., RRC_INACTIVE).

In idle mode/state, an RRC context for communication between the UE and the network may not be established in the RAN, and the UE may not belong to any specific cell. Also, in idle mode/state, there may not be a core network connection to the UE. Since the UE is in sleep mode most of the time to reduce battery consumption, data transmission between the UE and the network may not occur. A UE in idle mode/state may wake up periodically to receive paging messages from the network. Mobility can be handled by the UE through cell reselection. Since uplink synchronization is not maintained, the UE may not perform uplink transmission other than random access transmission (i.e., random access preamble transmission) for transiting to the connected mode/state.

In connected mode/state, an RRC context for communication between the UE and the network may be established in the RAN. Also, in connected mode/state, a core network connection to the UE may be established. Since the UE belongs to a specific cell, a C-RNTI for signaling between the UE and the network may be configured for the UE. Data transmission between the UE and the network may occur. Mobility can be handled by the network—that is, the UE can provide measurement reports to the network, and the network can send mobility commands to the UE to perform mobility. Uplink timing alignment needs to be established based on random access and needs to be maintained for data transmission.

In the inactive mode/state, the RRC context for communication between the UE and the network may be maintained in the RAN. Data transmission between the UE and the network may not occur. Since the core network connection is maintained for the UE, the UE can quickly transition to a connected mode/state for data transmission. In transitioning to connected mode/state, core network signaling may not be required. The RRC context is already established in the network, and the transition to connected mode/state can be handled in the RAN. The UE may be allowed to be in sleep mode similarly to idle mode/state, and mobility may be handled through cell reselection without network involvement. An inactive mode/state can be understood as a combination of an idle mode/state and a connected mode/state.

As shown in FIG. 9, the UE may transition from idle mode/state to connected mode/state by performing an initial access procedure or an RRC connection establishment procedure. The RRC connection establishment procedure may be initiated by the UE transmitting an RRC setup request message to the network. If RRC connection establishment is successful, the UE may receive an RRC setup message from the network in response to the RRC setup request message. When the UE receives the RRC setup message from the network, the UE enters a connected mode/state and may obtain a network connection. The UE may transmit an RRC setup complete message to the network in response to the RRC setup message.

The UE may transition from connected mode/state to idle mode/state when detach, RRC connection release occurs, and/or connection failure (e.g., radio link failure (RLF)) occurs.

For example, when the UE receives an RRC connection release message, RRC connection release may occur.

For example, the UE and the base station may use the data inactivity timer to determine whether the UE's connected mode/state is maintained or whether the UE transitions to an idle mode/state. When the UE receives a MAC SDU from the network in the connected mode/state or generates a MAC SDU to be transmitted to the network, the UE may start or restart a data inactivity timer configured by the network. When the data inactivity timer expires, since no MAC SDU has been transmitted or received while the data inactivity timer is running, the UE can transition from the connected mode/state to the idle mode/state. The base station and the UE may determine the connected mode/state or the idle mode/state by starting the data inactivity timer, respectively, and when the mode/state is changed to idle, each base station and the UE do not notify the other of the state change.

When an RRC connection is suspended, the UE can transition from connected mode/state to inactive mode/state.

For example, when the UE receives an RRC connection release message including suspend configuration, the RRC connection may be suspended.

When the RRC connection is resumed by performing an RRC connection resumption procedure, the UE may transition from the inactive mode/state to the connected mode/state. The RRC connection resume procedure may be initiated by the UE transmitting an RRC resume request message to the network. If RRC connection resumption is successful, the UE may receive an RRC resume message from the network in response to the RRC resume request message. When the UE receives the RRC resume message from the network, the UE enters the connected mode/state and obtain a network connection. The UE may transmit an RRC resume complete message to the network in response to the RRC resume message.

The UE may transition from an inactive mode/state to an idle mode/state when a connection failure such as RLF occurs.

Figure 10:
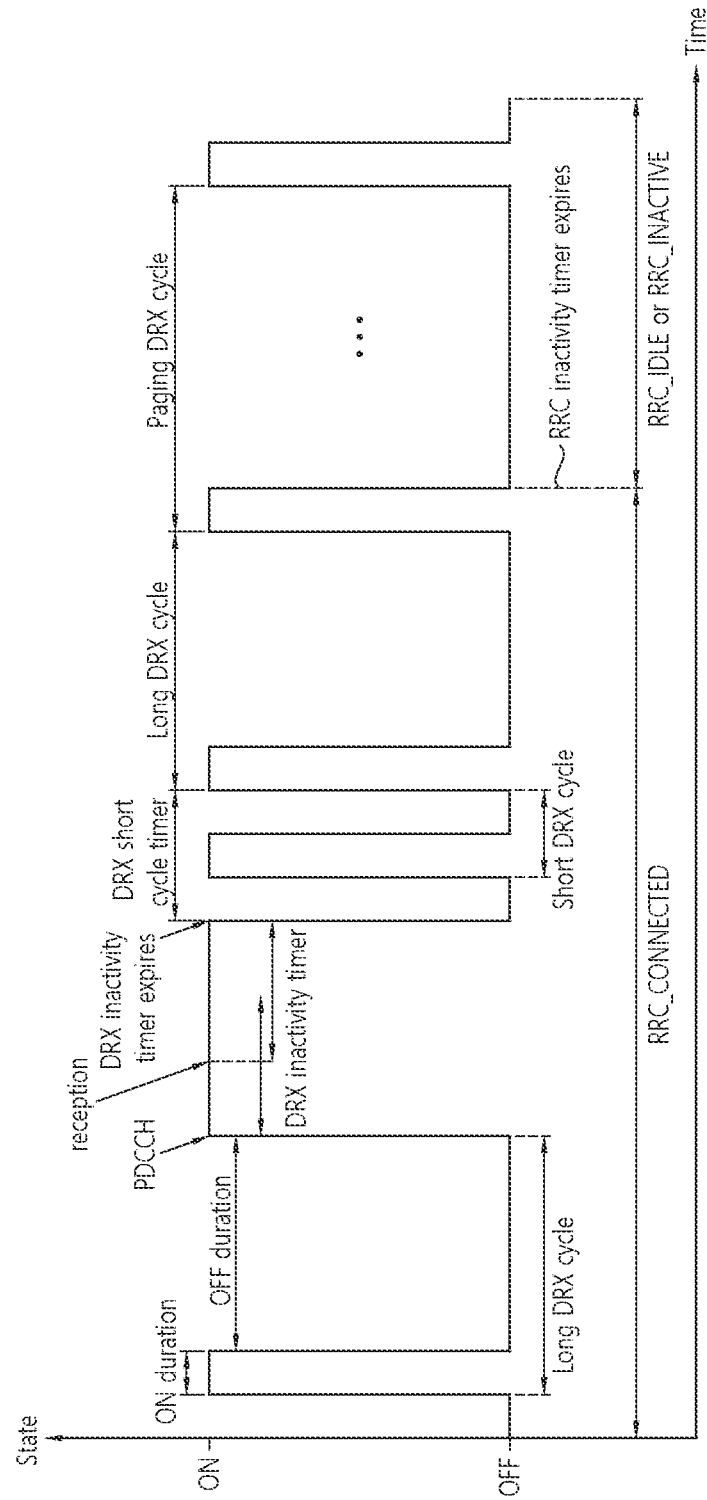
FIG. 10 shows an example of a DRX operation according to an embodiment of the present disclosure.

FIG. 10 shows an example of a DRX operation according to an embodiment of the present disclosure.

A UE may use DRX to reduce power consumption. The DRX cycle may be repeated periodically, and the DRX cycle includes a DRX ON duration (or active time/DRX active time) in which the UE wakes up and monitors the PDCCH for the UE, and a DRX OFF duration (or inactive time/DRX inactive time) in which the UE sleeps and does not monitor the PDCCH for the UE. Since the DRX cycle is periodically repeated, the DRX ON duration and the DRX OFF duration may also be periodically repeated according to the DRX cycle. The DRX cycle may include a long DRX cycle and a short DRX cycle used in RRC_CONNECTED, and may include a paging DRX cycle used in RRC_IDLE and/or RRC_INACTIVE. DRX in RRC_CONNECTED may also be referred to as "connected mode DRX (CDRX)".

In RRC_CONNECTED, the UE can wake up in the DRX ON duration of the long DRX cycle and monitor the PDCCH for the UE (e.g., PDCCH addressed to C-RNTI), and sleep in the DRX OFF duration of the long DRX cycle and not monitor the PDCCH for the UE.

When the UE receives the PDCCH for the UE in the DRX ON duration, the UE may start the DRX inactivity timer and start/restart the RRC inactivity timer. The UE may receive DL data from the network or transmit UL data to the network based on the PDCCH for the UE.

While the DRX inactivity timer is running, the UE may receive the PDCCH for the UE. In this case, the UE may restart the DRX inactivity timer and the RRC inactivity timer.

The UE may receive DL data from the network or transmit UL data to the network based on the PDCCH for the UE.

If there is no PDCCH for the UE, the DRX inactivity timer may expire. When the DRX Inactivity Timer expires, the UE may start the DRX Short Cycle Timer. While the DRX short cycle timer is running, the short DRX cycle may be repeated periodically. The UE may wake up in the DRX ON duration of the short-term DRX cycle and monitor the PDCCH for the UE, and may sleep in the DRX OFF duration of the short-term DRX cycle and not monitor the PDCCH for the UE.

When the DRX short cycle timer expires, the short DRX cycle ends and the long DRX cycle repeats periodically.

When the RRC inactivity timer expires, the UE enters RRC_IDLE or RRC_INACTIVE. CDRX ends.

At RRC_IDLE (or RRC_INACTIVE), the paging DRX operation starts. When the paging DRX operation starts, the paging DRX cycle may be periodically repeated. The UE may monitor the paging PDCCH for the UE (i.e., PDCCH addressed to P-RNTI) in the DRX ON duration of the paging DRX cycle, and may sleep in the DRX OFF duration of the paging DRX cycle and not monitor the paging PDCCH for the UE. When the UE receives a paging PDCCH for the UE, the UE may receive a paging message on the PDSCH indicated by the paging PDCCH and perform an RRC connection establishment procedure.

The UE can monitor one paging occasion (PO) per paging DRX cycle. A PO is a set of PDCCH monitoring occasions and may consist of a plurality of time slots (e.g., subframes or OFDM symbols) through which paging DCI can be transmitted. One paging frame (PF) is one radio frame and may include one or more POs and/or a starting point of the PO.

In the above, the UE may set at least one of a DRX cycle (e.g., a long DRX cycle, a short DRX cycle, a paging DRX cycle, a DRX ON duration and/or a DRX OFF duration), a DRX inactivity timer, or a DRX short cycle timer from the network. For example, the UE receives a DRX configuration comprising at least one of a long DRX cycle (e.g., longdrx-CycleStartOffset), a short DRX cycle, a paging DRX cycle, a DRX ON duration (e.g., onDurationTimer), a DRX OFF duration, a DRX inactivity timer, or a DRX short cycle timer from the network. The UE may also be configured with an RRC inactivity timer from the network.

DRX-related procedures and technical specifications are shown in Table 5 below:

TABLE 5

The MAC entity may be configured by RRC with a DRX functionality that controls the UE's PDCCH monitoring activity for the MAC entity's C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and AI-RNTI. When using DRX operation, the MAC entity shall also monitor PDCCH according to requirements found in other clauses of this specification. When in RRC_CONNECTED, if DRX is configured, for all the activated Serving Cells, the MAC entity may monitor the PDCCH discontinuously using the DRX operation specified in this clause; otherwise the MAC entity shall monitor the PDCCH as specified in TS 38.213 [6].
NOTE 1: If Sidelink resource allocation mode 1 is configured by RRC, a DRX functionality is not configured.

TABLE 5-continued

RRC controls DRX operation by configuring the following parameters:
- drx-onDurationTimer: the duration at the beginning of a DRX cycle;
- drx-SlotOffset: the delay before starting the drx-onDurationTimer;
- drx-InactivityTimer: the duration after the PDCCH occasion in which a PDCCH indicates a new UL or DL transmission for the MAC entity;
- drx-RetransmissionTimerDL (per DL HARQ process except for the broadcast process): the maximum duration until a DL retransmission is received;
- drx-RetransmissionTimer UL (per UL HARQ process): the maximum duration until a grant for UL retransmission is received;
- drx-LongCycleStartOffset: the Long DRX cycle and drx-StartOffset which defines the subframe where the Long and Short DRX cycle starts;
- drx-ShortCycle (optional): the Short DRX cycle;
- drx-ShortCycleTimer (optional): the duration the UE shall follow the Short DRX cycle;
- drx-HARQ-RTT-TimerDL (per DL HARQ process except for the broadcast process): the minimum duration before a DL assignment for HARQ retransmission is expected by the MAC entity;
- drx-HARQ-RTT-TimerUL (per UL HARQ process): the minimum duration before a UL HARQ retransmission grant is expected by the MAC entity;
- ps-Wakeup (optional): the configuration to start associated drx-onDurationTimer in case DCP is monitored but not detected;
- ps-TransmitOtherPeriodicCSI (optional): the configuration to report periodic CSI that is not L1-RSRP on PUCCH during the time duration indicated by drx-onDurationTimer in case DCP is configured but associated drx-onDurationTimer is not started;
- ps-TransmitPeriodicL1-RSRP (optional): the configuration to transmit periodic CSI that is L1-RSRP on PUCCH during the time duration indicated by drx-onDurationTimer in case DCP is configured but associated drx-onDurationTimer is not started.

Serving Cells of a MAC entity may be configured by RRC in two DRX groups with separate DRX parameters. When RRC does not configure a secondary DRX group, there is only one DRX group and all Serving Cells belong to that one DRX group. When two DRX groups are configured, each Serving Cell is uniquely assigned to either of the two groups. The DRX parameters that are separately configured for each DRX group are: drx-onDurationTimer, drx-InactivityTimer. The DRX parameters that are common to the DRX groups are: drx-SlotOffset, drx-RetransmissionTimerDL, drx-RetransmissionTimerUL, drx-LongCycleStartOffset, drx-ShortCycle (optional), drx-ShortCycleTimer (optional), drx-HARQ-RTT-TimerDL, and drx-HARQ-RTT-Timer UL.

When a DRX cycle is configured, the Active Time for Serving Cells in a DRX group includes the time while:
- drx-onDurationTimer or drx-InactivityTimer configured for the DRX group is running; or
- drx-RetransmissionTimerDL or drx-RetransmissionTimerUL is running on any Serving Cell in the DRX group; or
- ra-ContentionResolutionTimer (as described in clause 5.1.5) or msgB-ResponseWindow (as described in clause 5.1.4a) is running; or
- a Scheduling Request is sent on PUCCH and is pending (as described in clause 5.4.4); or
- a PDCCH indicating a new transmission addressed to the C-RNTI of the MAC entity has not been received after successful reception of a Random Access Response for the Random Access Preamble not selected by the MAC entity among the contention-based Random Access Preamble (as described in clauses 5.1.4 and 5.1.4a).

When DRX is configured, the MAC entity shall:
1> if a MAC PDU is received in a configured downlink assignment:
2> start the drx-HARQ-RTT-TimerDL for the corresponding HARQ process in the first symbol after the end of the corresponding transmission carrying the DL HARQ feedback;
2> stop the drx-RetransmissionTimerDL for the corresponding HARQ process.
1> if a MAC PDU is transmitted in a configured uplink grant and LBT failure indication is not received from lower layers:
2> start the drx-HARQ-RTT-TimerUL for the corresponding HARQ process in the first symbol after the end of the first repetition of the corresponding PUSCH transmission;
2> stop the drx-RetransmissionTimer UL for the corresponding HARQ process.
1> if a drx-HARQ-RTT-TimerDL expires:
2> if the data of the corresponding HARQ process was not successfully decoded:
3> start the drx-RetransmissionTimerDL for the corresponding HARQ process in the first symbol after the expiry of drx-HARQ-RTT-TimerDL.
1> if a drx-HARQ-RTT-TimerUL expires:
2> start the drx-RetransmissionTimerUL for the corresponding HARQ process in the first symbol after the expiry of drx-HARQ-RTT-Timer UL.
1> if a DRX Command MAC CE or a Long DRX Command MAC CE is received:
2> stop drx-onDurationTimer for each DRX group;
2> stop drx-InactivityTimer for each DRX group.
1> if drx-InactivityTimer for a DRX group expires:
2> if the Short DRX cycle is configured:
3> start or restart drx-ShortCycleTimer for this DRX group in the first symbol after the expiry of drx-InactivityTimer;
3> use the Short DRX cycle for this DRX group.
2> else:
3> use the Long DRX cycle for this DRX group.

TABLE 5-continued

1> if a DRX Command MAC CE is received:
2> if the Short DRX cycle is configured:
3> start or restart drx-ShortCycleTimer for each DRX group in the first symbol after the end of DRX Command MAC CE reception;
3> use the Short DRX cycle for each DRX group.
2> else:
3> use the Long DRX cycle for each DRX group.
1> if drx-ShortCycleTimer for a DRX group expires:
2> use the Long DRX cycle for this DRX group.
1> if a Long DRX Command MAC CE is received:
2> stop drx-ShortCycleTimer for each DRX group;
2> use the Long DRX cycle for each DRX group.
1> if the Short DRX cycle is used for a DRX group, and [(SFN > 10) + subframe number] modulo (drx-ShortCycle) = (drx-StartOffset) modulo (drx-ShortCycle):
2> start drx-onDurationTimer for this DRX group after drx-SlotOffset from the beginning of the subframe.
1> if the Long DRX cycle is used for a DRX group, and [(SFN > 10) + subframe number] modulo (drx-LongCycle) = drx-StartOffset:
2> if DCP monitoring is configured for the active DL BWP as specified in TS 38.213 [6], clause 10.3:
3> if DCP indication associated with the current DRX cycle received from lower layer indicated to start drx-onDurationTimer, as specified in TS 38.213 [6]; or
3> if all DCP occasion(s) in time domain, as specified in TS 38.213 [6], associated with the current DRX cycle occurred in Active Time considering grants/assignments/DRX Command MAC CE/Long DRX Command MAC CE received and Scheduling Request sent until 4 ms prior to start of the last DCP occasion, or within BWP switching interruption length, or during a measurement gap, or when the MAC entity monitors for a PDCCH transmission on the search space indicated by recoverySearchSpaceId of the SpCell identified by the C-RNTI while the ra-ResponseWindow is running (as specified in clause 5.1.4); or
3> if ps-Wakeup is configured with value true and DCP indication associated with the current DRX cycle has not been received from lower layers:
4> start drx-onDurationTimer after drx-SlotOffset from the beginning of the subframe.
2> else:
3> start drx-onDurationTimer for this DRX group after drx-SlotOffset from the beginning of the subframe.
NOTE 2: In case of unaligned SFN across carriers in a cell group, the SFN of the SpCell is used to calculate the DRX duration.
1> if a DRX group is in Active Time:
2> monitor the PDCCH on the Serving Cells in this DRX group as specified in TS 38.213 [6];
2> if the PDCCH indicates a DL transmission:
3> start the drx-HARQ-RTT-TimerDL for the corresponding HARQ process in the first symbol after the end of the corresponding transmission carrying the DL HARQ feedback;
NOTE 3: When HARQ feedback is postponed by PDSCH-to-HARQ_feedback timing indicating a non-numerical k1 value, as specified in TS 38.213 [6], the corresponding transmission opportunity to send the DL HARQ feedback is indicated in a later PDCCH requesting the HARQ-ACK feedback.
3> stop the drx-RetransmissionTimerDL for the corresponding HARQ process.
3> if the PDSCH-to-HARQ_feedback timing indicate a non-numerical k1 value as specified in TS 38.213 [6]:
4> start the drx-RetransmissionTimerDL in the first symbol after the PDSCH transmission for the corresponding HARQ process.
2> if the PDCCH indicates a UL transmission:
3> start the drx-HARQ-RTT-TimerUL for the corresponding HARQ process in the first symbol after the end of the first repetition of the corresponding PUSCH transmission;
3> stop the drx-RetransmissionTimer UL for the corresponding HARQ process.
2> if the PDCCH
indicates a new transmission (DL or UL) on a Serving Cell in this DRX group:
3> start or restart drx-InactivityTimer for this DRX group in the first symbol after the end of the PDCCH reception.
2> if a HARQ process receives downlink feedback information and acknowledgement is indicated:
3> stop the drx-RetransmissionTimerUL for the corresponding HARQ process.
1> if DCP monitoring is configured for the active DL BWP as specified in TS 38.213 [6], clause 10.3; and
1> if the current symbol n occurs within drx-onDurationTimer duration; and
1> if drx-onDurationTimer associated with the current DRX cycle is not started as specified in this clause:
2> if the MAC entity would not be in Active Time considering grants/assignments/DRX Command MAC CE/Long DRX Command MAC CE received and Scheduling Request sent until 4 ms prior to symbol n when evaluating all DRX Active Time conditions as specified in this clause:
3> not transmit periodic SRS and semi-persistent SRS defined in TS 38.214 [7];
3> not report semi-persistent CSI configured on PUSCH;
3> if ps-TransmitPeriodicL1-RSRP is not configured with value true:
4> not report periodic CSI that is L1-RSRP on PUCCH.

TABLE 5-continued

3>     if ps-TransmitOtherPeriodicCSI is not configured with value true:
4>     not report periodic CSI that is not L1-RSRP on PUCCH.
1>     else:
2>     in current symbol n, if a DRX group would not be in Active Time considering grants/assignments scheduled on Serving Cell(s) in this DRX group and DRX Command MAC CE/Long DRX Command MAC CE received and Scheduling Request sent until 4 ms prior to symbol n when evaluating all DRX Active Time conditions as specified in this clause:
3>     not transmit periodic SRS and semi-persistent SRS defined in TS 38.214 [7] in this DRX group;
3>     not report CSI on PUCCH and semi-persistent CSI configured on PUSCH in this DRX group.
2>     if CSI masking (csi-Mask) is setup by upper layers:
3>     in current symbol n, if drx-onDurationTimer of a DRX group would not be running considering grants/assignments scheduled on Serving Cell(s) in this DRX group and DRX Command MAC CE/Long DRX Command MAC CE received until 4 ms prior to symbol n when evaluating all DRX Active Time conditions as specified in this clause; and
4>     not report CSI on PUCCH in this DRX group.
NOTE 4: If a UE multiplexes a CSI configured on PUCCH with other overlapping UCI(s) according to the procedure specified in TS 38.213 [6] clause 9.2.5 and this CSI multiplexed with other UCI(s) would be reported on a PUCCH resource outside DRX Active Time of the DRX group in which this PUCCH is configured, it is up to UE implementation whether to report this CSI multiplexed with other UCI(s).
Regardless of whether the MAC entity is monitoring PDCCH or not on the Serving Cells in a DRX group, the MAC entity transmits HARQ feedback, aperiodic CSI on PUSCH, and aperiodic SRS defined in TS 38.214 [7] on the Serving Cells in the DRX group when such is expected.
The MAC entity needs not to monitor the PDCCH if it is not a complete PDCCH occasion (e.g. the Active Time starts or ends in the middle of a PDCCH occasion).

On the other hand, for the power saving operation (e.g., sidelink DRX operation) of the UE, the sidelink DRX configured to be used by the P-UE (power saving UE) (e.g., sidelink DRX cycle (time point and/or length), sidelink DRX ON duration (time and/or length), sidelink DRX OFF duration (time and/or length) and/or timer for supporting sidelink DRX operation) may be defined. The sidelink DRX operation may also be performed similarly to the DRX operation shown in FIG. 10. For example, the sidelink DRX cycle may be periodically repeated, and the sidelink DRX cycle may include a sidelink DRX ON duration in which the UE wakes up to perform sidelink reception/transmission and a sidelink DRX OFF duration in which the UE sleeps and does not perform sidelink reception/transmission. The UE may monitor the PSCCH to perform sidelink reception/transmission in the sidelink DRX ON duration, and may not monitor the PSCCH in the sidelink DRX OFF duration. Since the sidelink DRX cycle is periodically repeated, the sidelink DRX ON duration and the sidelink DRX OFF duration may also be periodically repeated. The UE may receive sidelink DRX configuration from the network or other UEs, and determine the timing of the sidelink DRX ON duration based on the sidelink DRX configuration. The UE may start the sidelink DRX ON duration timer that runs during the sidelink DRX ON duration at the time of the sidelink DRX ON duration, and may regard a duration in which the sidelink DRX ON duration timer does not run as a sidelink DRX OFF duration in the sidelink DRX cycle. As another example, the UE may be configured with the timing and/or length of the sidelink DRX OFF duration.

When sidelink transmission/reception occurs, the length of a sidelink DRX cycle may be shortened and/or the length of a sidelink DRX ON duration may increase for a certain period of time. For example, when sidelink transmission/reception occurs in a sidelink DRX ON duration, the UE may start a sidelink DRX inactivity timer. The UE may perform sidelink transmission/reception while the sidelink DRX inactivity timer is running, and when sidelink transmission/reception occurs, the UE may restart the sidelink DRX inactivity timer. When sidelink transmission/reception does not occur, the sidelink DRX inactivity timer may expire and a sidelink DRX OFF duration may begin. In the above, occurrence of sidelink transmission/reception may include reception of a PSCCH scheduling sidelink transmission/reception.

The present disclosure proposes the operation of a transmitting (TX) UE and a receiving (RX) UE in a sidelink DRX ON duration/sidelink DRX OFF duration. Specifically, the present disclosure proposes method and apparatus for the RX UE to receive the SCI (which may include reserved transmission resource information) transmitted by the TX UE and the PSCCH (e.g., SL data) associated with the SCI, and to perform sidelink power saving operation based on reserved transmission resource information included in SCI. In the following description, 'when, if, in case of' may be replaced with 'based on'.

Figure 11:
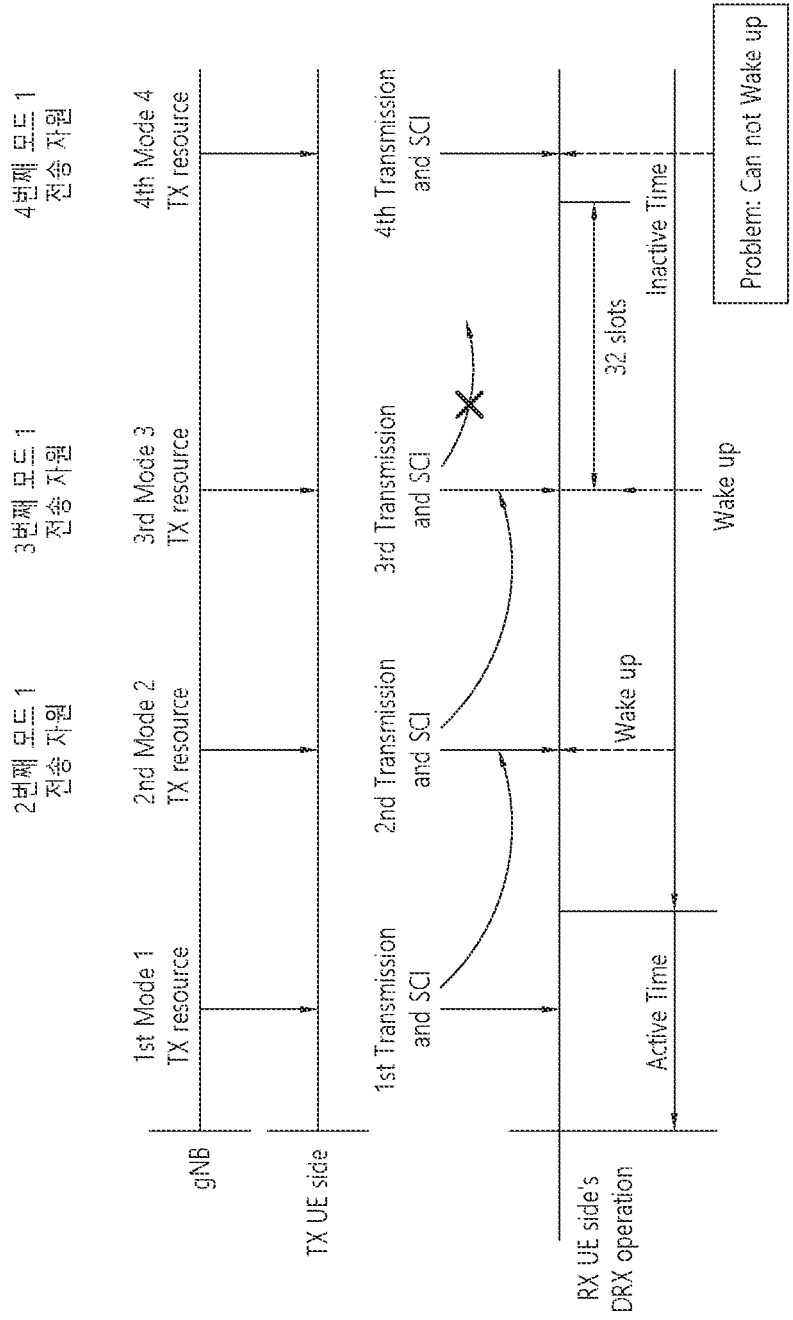
FIG. 11 shows an example of a resource reservation procedure in mode 1 according to an embodiment of the present disclosure.

FIG. 11 shows an example of a resource reservation procedure in mode 1 according to an embodiment of the present disclosure.

Referring to FIG. 11, when an RX UE supporting a sidelink DRX operation receives an SCI transmitted by a TX UE (i.e., an SCI including reserved transmission scheduling information for PSSCH (i.e., Sidelink Data) reception), the RX UE may determine the location of the reserved transmission resource and monitor/receive SL data transmitted by the TX UE at the location of the reserved transmission resource. If the RX UE is a UE performing a sidelink DRX operation, even if the location of the next transmission resource reserved through SCI is in the SL DRX inactive time (that is, a period in which PSCCH/PSSCH does not need to be monitored and/or a period in which SL sleep mode can be operated), the RX UE wakes up at the location of transmission resources reserved through SCI (or a period including the same) to monitor and receive SL data transmitted by the TX UE. However, the TX UE can reserve subsequent transmission resources through multiple SCIs only when the interval between the previous transmission and the next transmission is within the time interval allowed for resource reservation (e.g., 32 slots).

In FIG. 11, when the base station allocates the mode 1 resource to the TX UE, the base station may allocate the next transmission resource (e.g., the third transmission resource) to a position where the interval between the previous transmission resource (e.g., the third transmission resource) and the next transmission resource (e.g., the fourth transmission resource) is greater than 32 slots. In this case, the TX UE cannot include reservation information for the fourth transmission in the SCI associated with the the third transmission. That is, when the RX UE receives the SCI associated with the third transmission resource, since the SCI does not include reservation information for the fourth transmission resource, the RX UE may consider the third transmission as the last transmission and transition to sleep mode during the remaining SL inactive time. In this case, the RX UE may not be able to receive the fourth transmission transmitted by the TX UE.

In addition, even in mode 2 operation in which the UE selects a resource by itself based on sensing, the TX UE may notify the RX UE of reservation information for the next transmission resource through SCI. Even in this case, if the next transmission resource is not within 32 slots of the previous transmission resource, the TX UE cannot notify the RX UE of reservation information for the next transmission resource through SCI.

Figure 12:
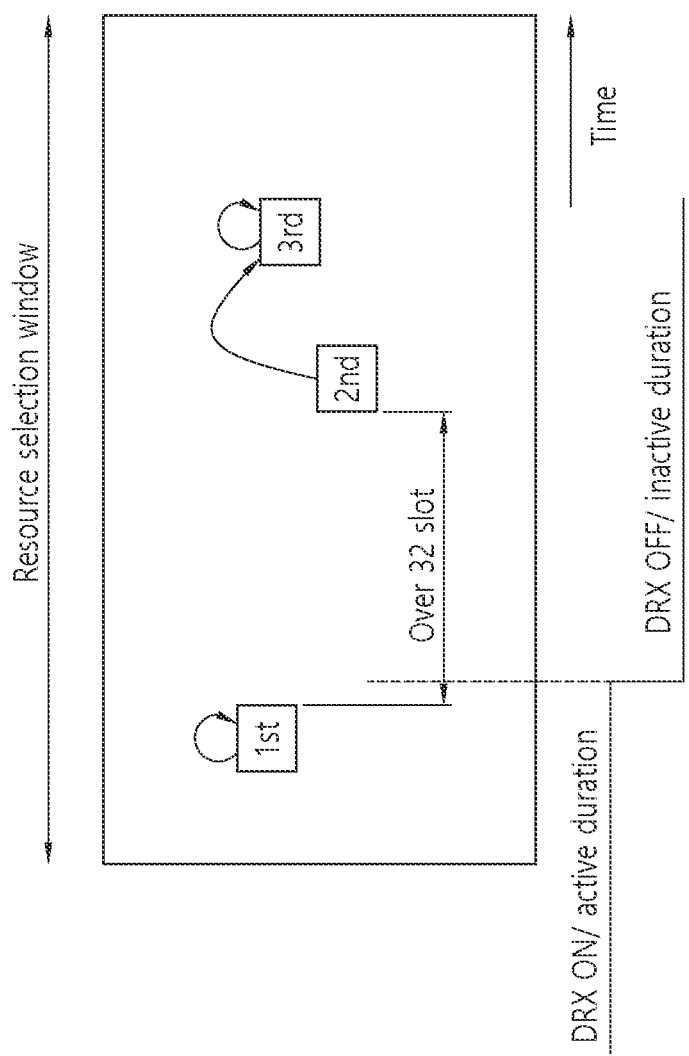
FIG. 12 shows a first example of a resource reservation procedure in mode 2 according to an embodiment of the present disclosure.

FIG. 12 shows a first example of a resource reservation procedure in mode 2 according to an embodiment of the present disclosure.

Referring to FIG. 12, when the TX UE selects a resource through a mode 2 sensing operation and the interval between the selected resources is greater than or equal to a specific time interval (e.g., 32 slots), the TX UE may not indicate the location of the next resource to the RX UE.

For example, when the TX UE selects three resources (e.g., a first resource for (initial) transmission/a second resource for retransmission/a third resource for next retransmission), the time interval between the first resource and the second resource may be greater/more than 32 slots. In this case, the SCI transmitted in the first resource cannot indicate (location of) the second resource. On the other hand, when the interval between the selected resources is within 32 slots, the first resource may indicate (location of) the second/third resource. FIG. 12 illustratively shows a case where SCI transmitted in the first resource does not indicate (a location of) the second resource.

When the DRX pattern of the RX UE is as shown in FIG. 12, the RX UE receives SCI transmitted in the first resource, and when the time interval between the first resource and the second resource exceeds 32 slots, the RX UE cannot know the location of the next transmission resource. Therefore, the RX UE may enter the OFF duration according to the DRX pattern. In other words, the RX UE cannot receive retransmitted packets other than packets transmitted in the first resource.

Figure 13:
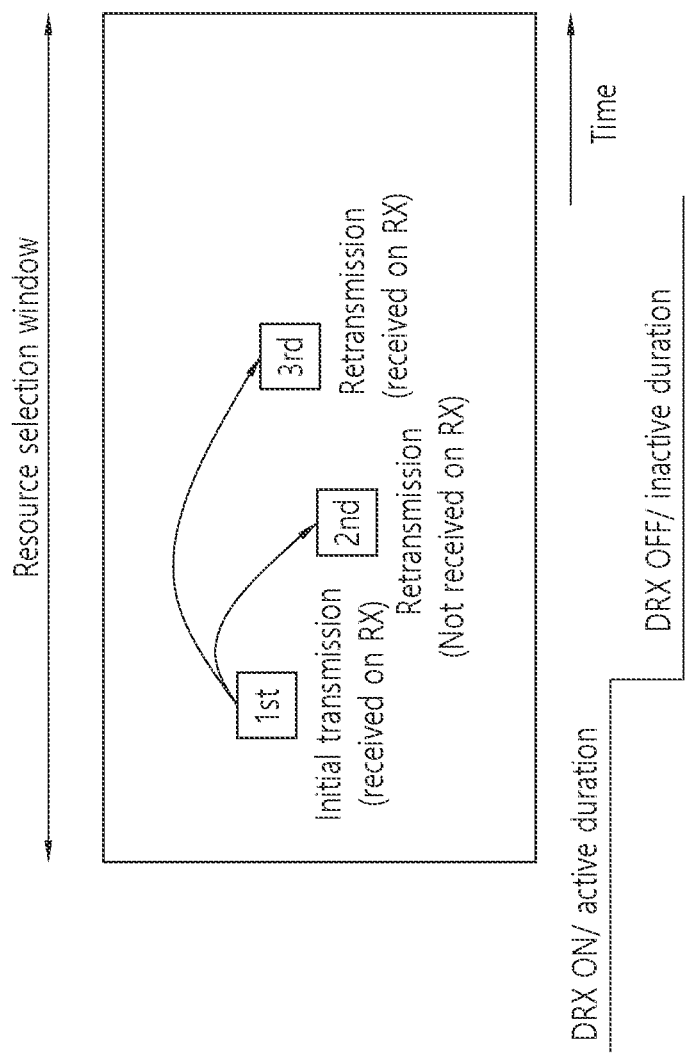
FIG. 13 shows a second example of a resource reservation procedure in mode 2 according to an embodiment of the present disclosure.

FIG. 13 shows a second example of a resource reservation procedure in mode 2 according to an embodiment of the present disclosure.

Referring to FIG. 13, the initial transmission SL data may indicate the location of retransmission resources. For example, when initial transmission and two retransmissions are performed, the initial SL data may transmit SCI associated with the initial SL data including the locations of the second and third resources. When the initial SL data informs the locations of the second SL data and the third SL data, the RX UE may fail to receive the second SL data. When the RX UE performs the DRX operation, the RX UE may also fail to receive the third SL data because the active time/time expires without being extended beyond reception of the second SL data.

The present disclosure proposes method and apparatus for resolving problems that if the location of a resource for the next transmission (or reservation information for the next transmission resource) cannot be informed through SCI in mode1/mode 2, the DRX UE may not be able to receive the next transmission. In particular, the present disclosure proposes a method and apparatus for resolving the above problem using a common/default DRX pattern.

Figure 14:
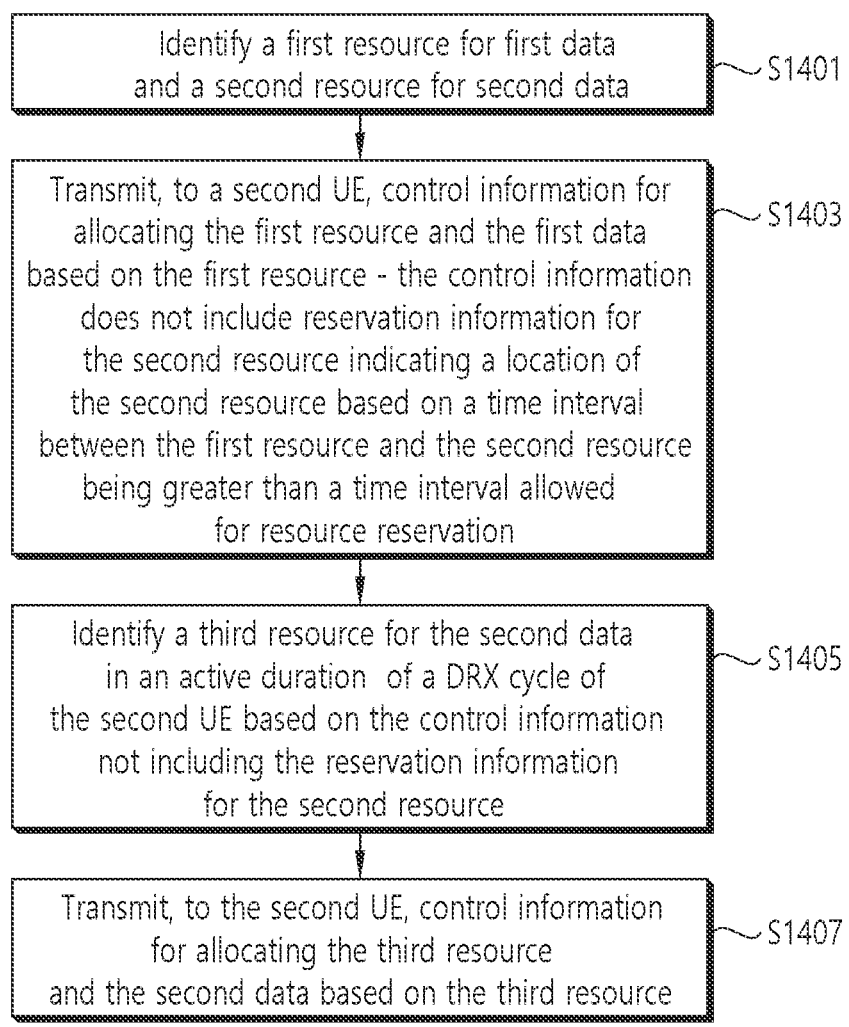
FIG. 14 shows an example of a method performed by a first UE according to an embodiment of the present disclosure.

FIG. 14 shows an example of a method performed by a first UE according to an embodiment of the present disclosure.

Referring to FIG. 14, in step S1401, the first UE may identify a first resource for first data and a second resource for second data;

In step S1403, the first UE may transmit, to a second UE, control information for allocating the first resource and the first data based on the first resource. The control information may not include reservation information for the second resource indicating a location of the second resource based on a time interval between the first resource and the second resource being greater than a time interval allowed for resource reservation.

In step S1405, the first UE may identify a third resource for the second data in an active time of a discontinuous reception (DRX) cycle of the second UE based on the control information not including the reservation information for the second resource.

In step S1407, the first UE may transmit, to the second UE, control information for allocating the third resource and the second data based on the third resource.

In various embodiments, the first UE may autonomously select the first resource and the second resource from a resource pool configured for the first UE.

In various embodiments, the first UE may receive a sidelink grant for the first resource and a sidelink grant for the second resource from a network.

In various embodiments, the time interval allowed for resource reservation may be 32 slots.

In various embodiments, the time interval allowed for resource reservation may be greater than or equal to a time interval in which the active time of the DRX cycle of the second UE lasts from when transmission related to the second UE (e.g., transmission to and/or transmission by the second UE) occurs.

In various embodiments, the first UE may receive information for the DRX cycle of the second UE from the second UE or a network. The information for the DRX cycle of the second UE may comprise at least one of a time of the active time of the DRX cycle of the second UE, a length of the active time of the DRX cycle of the second UE, a time of the DRX cycle of the second UE, or a length of the DRX cycle of the second UE.

In various embodiments, the first UE may transmit a resource request for the third resource to a network based on a time interval between the first resource and the second resource being greater than a time interval allowed for resource reservation. The first UE may, in response to the resource request, receive a sidelink grant for the third resource.

In various embodiments, the first UE may autonomously select the third resource in an active time of the DRX cycle of the second UE based on a time interval between the first resource and the second resource being greater than a time interval allowed for resource reservation. The third resource may be selected from a resource pool configured for the first UE.

In various embodiments, the second data may correspond to retransmission of the first data.

In various embodiments, the location of the second resource may belong to an inactive time of the DRX cycle of the second UE.

In various embodiments, the control information for allocating the first resource may include information indicating that the second data to be transmitted exists.

In various embodiments, the reservation information for the second resource may be used to increase the active time of the DRX cycle of the second UE so that the active time of the DRX cycle of the second UE includes the location of the second resource.

In various embodiments, the first UE and the second UE are autonomous vehicles that perform vehicle-to-everything (V2X) communication with each other.

In various embodiments, a non-transitory computer readable medium has stored thereon a plurality of instructions that, when executed by a processor of a first user equipment (UE), perform operations comprising: identifying a first resource for first data and a second resource for second data; transmitting, to a second UE, control information for allocating the first resource and the first data based on the first resource, wherein the control information does not include reservation information for the second resource indicating a location of the second resource based on a time interval between the first resource and the second resource being greater than a time interval allowed for resource reservation; identifying a third resource for the second data in an active time of a discontinuous reception (DRX) cycle of the second UE based on the control information not including the reservation information for the second resource; and transmitting, to the second UE, control information for allocating the third resource and the second data based on the third resource.

In various embodiments, a memory of a processor for a first user equipment (UE) in a wireless communication system stores a software code implementing instructions that, when executed by the processor, perform operations comprising: identifying a first resource for first data and a second resource for second data; transmitting, to a second UE, control information for allocating the first resource and the first data based on the first resource, wherein the control information does not include reservation information for the second resource indicating a location of the second resource based on a time interval between the first resource and the second resource being greater than a time interval allowed for resource reservation; identifying a third resource for the second data in an active time of a discontinuous reception (DRX) cycle of the second UE based on the control information not including the reservation information for the second resource; and transmitting, to the second UE, control information for allocating the third resource and the second data based on the third resource.

Figure 15:
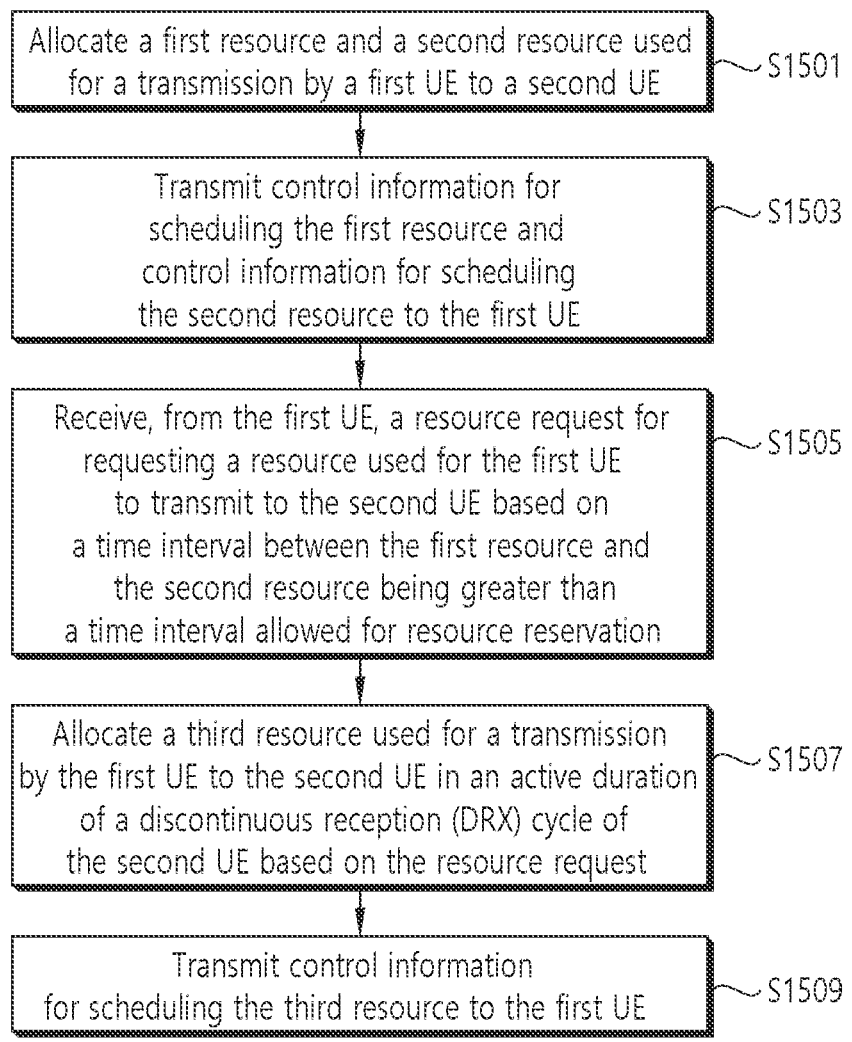
FIG. 15 shows an example of a method performed by a base station according to an embodiment of the present disclosure.

FIG. 15 shows an example of a method performed by a base station according to an embodiment of the present disclosure.

Referring to FIG. 15, in step S1501, the base station may allocate a first resource and a second resource used for a transmission by a first UE to a second UE.

In step S1503, the base station may transmit control information for scheduling the first resource and control information for scheduling the second resource to the first UE.

In step S1505, the base station may receive, from the first UE, a resource request for requesting a resource used for the first UE to transmit to the second UE based on a time interval between the first resource and the second resource being greater than a time interval allowed for resource reservation.

In step S1507, the base station may allocate a third resource used for a transmission by the first UE to the second UE in an active time of a discontinuous reception (DRX) cycle of the second UE based on the resource request.

In step S1509, the base station may transmit control information for scheduling the third resource to the first UE.

Hereinafter, detailed embodiments for preventing reception failure during sidelink DRX operation will be described.

<For Mode 1 Operation>

If the interval between sidelink grants (e.g., previous sidelink grant, next sidelink grant) indicated by the base station to the TX UE is 32 slots or more, the RX UE operating in DRX may not receive the next sidelink grant. In this case, the TX UE may request new resources to the base station. For example, the TX UE may notify the base station that the corresponding resource request is a resource (re) request for the DRX UE along with the resource request. The base station receiving the resource request may allocate resources considering even the ON duration of the common DRX pattern of the RX UE.

<For Mode 2 Operation>

I. When RX UE Enters DRX OFF Duration after Receiving SL Data

Since the TX UE knows information for the DRX pattern/cycle of the RX UE in advance, the TX UE may expect the RX UE to enter the DRX OFF duration after transmitting the first resource. In addition, even when a UE-specific DRX pattern is configured between the RX UE and the TX UE (e.g., unicast), the TX UE can expect that the RX UE is in the ON duration in a common DRX pattern/cycle. Since the common DRX pattern of the RX UE may vary depending on the service/PQI/destination address, the TX UE may not know all of the common DRX patterns used by the RX UE.

If the TX UE cannot indicate retransmission resources after transmitting SL data, at least one of the following methods may be performed:

Method 1) If a common DRX ON duration exists before a next specific DRX ON duration of the RX UE, the TX UE may perform a fallback operation (e.g., performing resource reselection again) in a common DRX ON duration. In this case, the TX UE may attempt (continue) retransmission if there is a remaining PDB of SL data to be currently transmitted. If there is no remaining PDB, the TX UE may drop the current SL data retransmission and transmit new SL data.

Method 2) When selecting a resource, the TX UE may select a resource in the ON duration of the common DRX as well as the UE-specific DRX of the RX UE. Alternatively, when the time interval between the retransmission resource selected in the UE-specific DRX and the resource selected for SL data transmission is greater than or equal to 32 slots, the TX UE may select a retransmission resource in a period including a common DRX ON duration of the RX (or TX) UE.

Since the common DRX is a value determined according to the service/PQI, the TX UE can know only the common DRX of the RX UE using the same service/PQI as the TX UE. In the present disclosure, the RX UE informs the TX UE of all common DRX that the RX UE is using (which may be different from the common DRX that the TX UE is using), or UE-specific DRX information established between the RX UE and other UEs. The TX UE may select and transmit resources in an ON duration of a common DRX pattern other than the common DRX configured between the TX UE and the RX UE or a specific DRX pattern configured between the RX UE and the other UE. This operation may be applied when selecting a retransmission resource or when the SCI for the current SL data transmission cannot indicate the next resource to be transmitted (e.g., when the next resource to be transmitted is beyond the range of 32 slots).

Method 3) If the TX UE is expected to enter the DRX OFF duration after the initial transmission and before the retransmission (or if the SCI for current SL data transmission cannot indicate the next transmission resource), the TX UE may fall back to initial operation (e.g., resource reselection). In the case of a retransmission operation, the TX UE may start again from the initial transmission in the next ON duration of the RX UE. Alternatively, if there is a remaining PDB, the TX UE may continue retransmission. Or, if it is expected that the retransmission resource already selected is included in the common DRX ON duration, the TX UE may perform retransmission as scheduled.

Method 4) The TX UE/RX UE considers that there is no (re)transmission if the transmission resource location of the transmission is informed during (initial) transmission, and considers that (re)transmission is performed when the location of another layer resource is notified. That is, the RX UE can implicitly determine whether or not (re)transmission is performed. However, when (re)transmission resources are allocated beyond the range of 32 slots from the initial transmission resources, the initial transmission includes information indicating the location of the transmission resource of the initial transmission, but since the initial transmission does not include information indicating the location of (re)transmission resources, the RX UE may not know whether (re)transmission will occur. In this case, as described above, the RX UE performing the DRX operation may not know whether (re)transmission SL data is transmitted in a state in which only initial SL data is received. In order to solve this problem, when the next resource exists beyond the range of 32 slots from the previous resource, the TX UE does not inform the resource location information, but may inform the RX UE that SL data to be transmitted later exists. The RX UE that has identified that there is retransmitted SL data through the SCI of the SL data may configure (or be configured) to have an active time (or DRX period) greater than or equal to 32 slots. A timer used for an active time/DRX ON duration greater than or equal to 32 slots may have a different timer value from an inactivity timer (used to increase the DRX ON duration/active time).

II. If the RX UE Fails to Receive the Second Retransmitted SL Data after Receiving the First SL Data Method 1) If the TX UE does not receive a response (e.g., ACK/NACK) on whether or not retransmitted SL data has been received by the RX UE, the TX UE may assume ≙ at the DRX state of the RX UE is an OFF duration and may not perform retransmission any more. The TX UE may perform resource reselection again in the ON duration of the RX UE.

At this time, the ON duration may include an ON duration of the RX (or TX) UE. After resource reselection, the TX UE may continue retransmission if there is a remaining PDB for the corresponding SL data. Alternatively, the TX UE may drop transmission of existing SL data/SL data and transmit new SL data.

Method 2) RX UE which has identified location of retransmission resource through SCI of initial SL data may, even if there is missing SL data (e.g., the second SL data in FIG. 13) between the transmission location of the initial SL data and the identified resource location, expect that SL data (e.g., the third SL data in FIG. 13) will be transmitted at the resource location identified from the initial SL data, and extend the active time to the expected location. In this case, even if the TX UE does not receive a response (e.g., ACK/NACK) from the RX UE, it may transmit retransmission SL data at a retransmission location reserved by initial SL data transmission.

Methods for RX UE entering DRX OFF duration after receiving SL data and methods for RX UE failing to receive the second retransmission SL data after receiving the first SL data can not only be applied in the case where the UE performing the DRX operation does not know whether retransmission resources exist after receiving the initial SL data, but also be applied for cases other than initial transmission/retransmission. For example, the above methods can be applied to all cases in which the currently transmitted SCI cannot indicate the location of a resource to be transmitted later, such as in a situation in which a periodic resource is selected.

Various embodiments of the present disclosure can be applied to a case where the UE receives SCI from the other UE in an SL active time (e.g., a period in which the UE monitors a sidelink channel or signal) or an end point of the SL active time, and the location of the next transmission resource reserved through the SCI received in the active time is in the SL inactive time (e.g., a period in which the UE does not have to monitor sidelink channels or signals, or a period in which the UE can operate in a power saving mode). In addition, various embodiments of the present disclosure may be applied to the SL active time and the SL inactive time of the UE.

The proposal of the present disclosure can be applied not only to Default/Common Sidelink DRX Settings, Default/Common Sidelink DRX Patterns/Cycles, and/or Parameters (and/or Timers) Included in Default/Common Sidelink DRX Settings, but also to UE pair specific sidelink DRX settings, UE pair specific sidelink DRX patterns/cycles and/or parameters (and/or timers) included in UE pair specific sidelink DRX settings. In addition, the term ON duration mentioned in the proposal of the present disclosure may be interpreted as an active time (e.g., a duration in which the UE wakes up and/or an RF module operates in "ON" to receive/transmit a radio signal). Furthermore, the term OFF duration mentioned in the proposal of the present disclosure may be extended and interpreted as a sleep time (e.g., a duration in which a UE operates in a sleep mode and/or an RF module is in an OFF state to save power—the TX UE does not have to operate in the sleep mode compulsorily in the sleep time period, and if necessary, it may be allowed to operate in active time for a while for sensing operation/transmission operation even in the sleep time). In addition, whether (some) proposed methods/rules of the present disclosure are applied and/or related parameters (e.g., threshold values) may be configured specifically (or differently, independently) according to resource pool, congestion level, service priority (and/or type), requirements (e.g., delay, reliability), traffic type (e.g. (non-)periodic generation) and/or sidelink transmission resource allocation mode (e.g. mode 1, mode 2).

For example, whether the proposed rules of the present disclosure are applied (and/or related parameter setting values) may also be configured specifically (and/or independently and/or differently) for at least one of resource pool, service/packet type (and/or priority), QoS requirements (e.g., URLLC/eMBB traffic, reliability, latency), cast type (e.g., unicast, groupcast, broadcast), (resource pool) congestion level (e.g., CBR), SL HARQ feedback method (e.g., NACK only feedback, ACK/NACK feedback), HARQ feedback enabled (Enabled) MAC PDU (and/or HARQ feedback disabled (Disabled) MAC PDU transmission) In case of PUCCH-based SL HARQ feedback reporting operation setting, re-emption (and/or re-evaluation) is performed (or resource reselection based on), (L2 or L1) (source and/or destination) identifier, PC5 RRC connection/link SL DRX performance case, SL mode type (resource allocation mode 1, resource allocation mode 2) or (non) periodic resource reservation.

The term "constant time" in the proposal of the present disclosure refers to a time during which the UE operates in an active time for a predefined time to receive sidelink signals or sidelink data from the other UE, or a time to during which the UE operates in active time as much as a specific period or a specific timer (e.g., sidelink DRX retransmission timer or sidelink DRX inactivity timer or timer that guarantees that the RX UE can operate in active time in DRX operation).

In addition, the proposal of the present disclosure and whether or not the proposed rule is applied (and/or related parameter configuration values) can also be applied to millimeter wave sidelink operation.

Various embodiments of the present disclosure may be combined with each other.

Hereinafter, device(s) which can implement various embodiments and/or methods of the present disclosure will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 16:
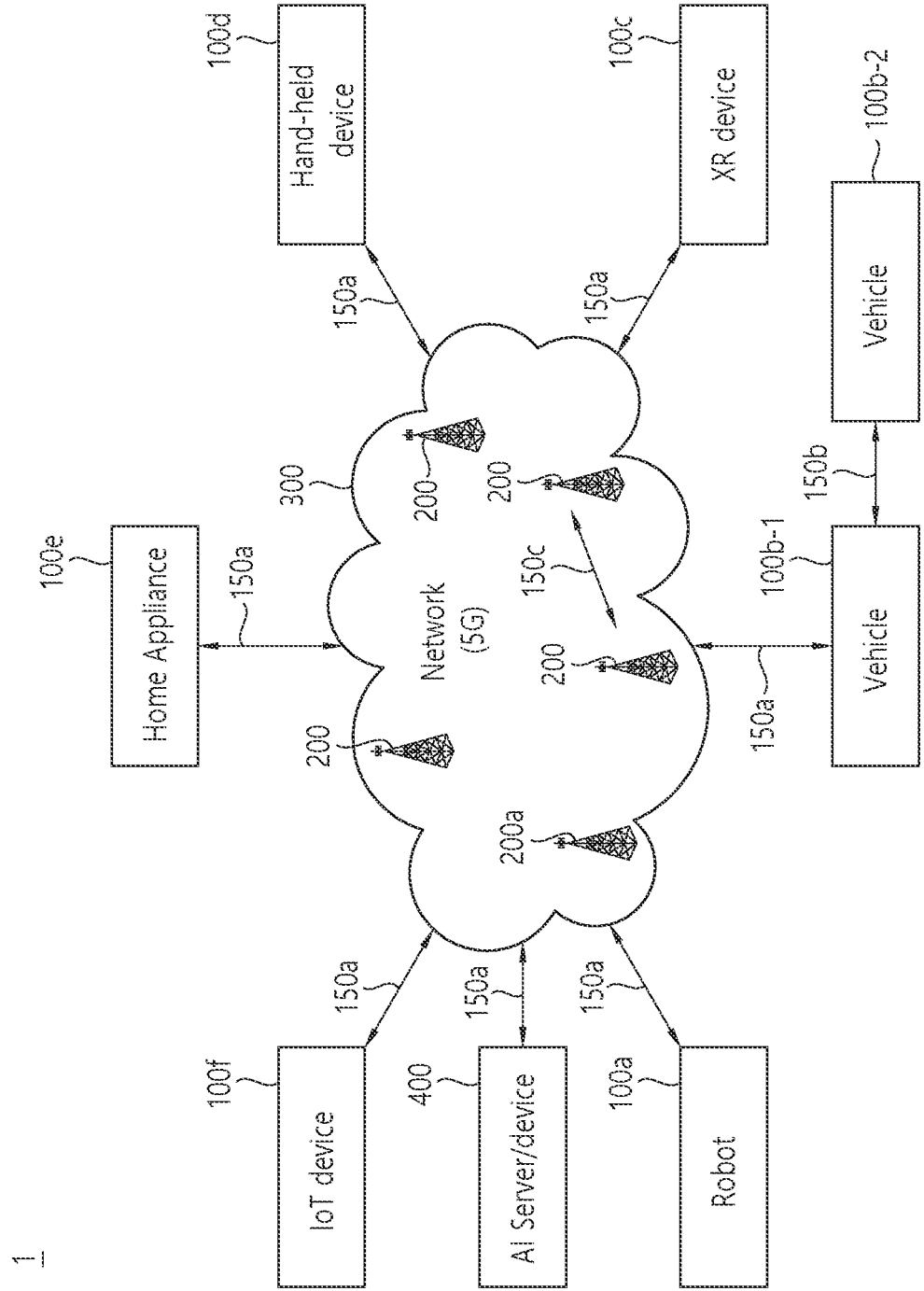
FIG. 16 shows a communication system 1, in accordance with an embodiment of the present disclosure.

FIG. 16 shows a communication system 1, in accordance with an embodiment of the present disclosure.

Referring to FIG. 16, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 17:
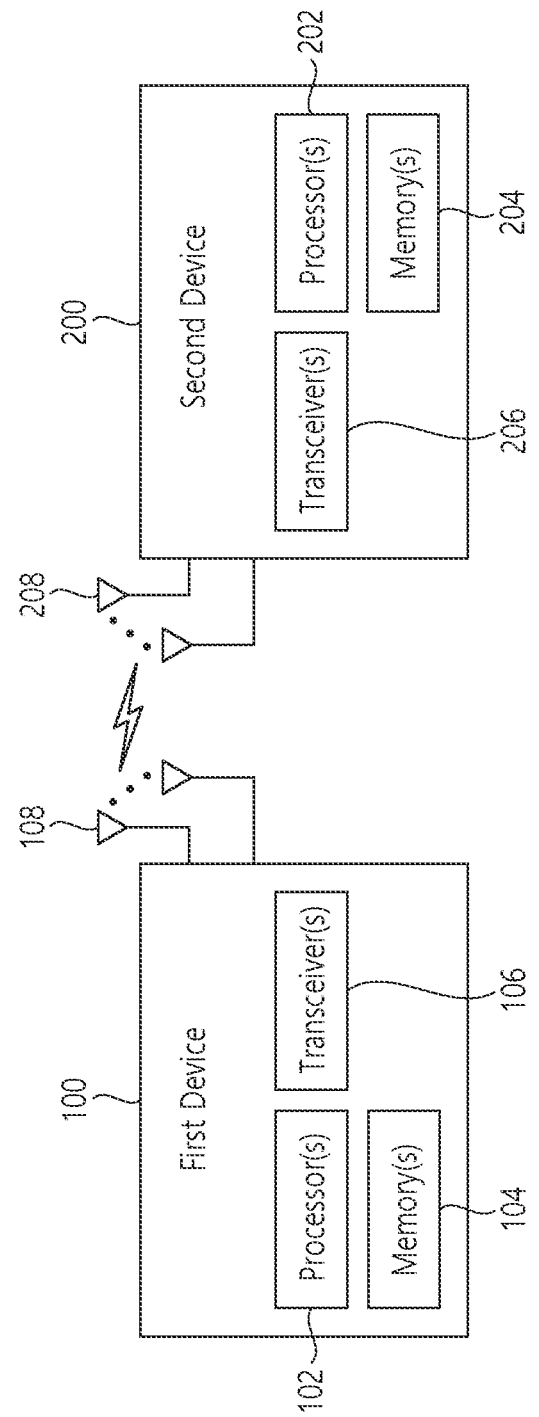
FIG. 17 shows wireless devices, in accordance with an embodiment of the present disclosure.

FIG. 17 shows wireless devices, in accordance with an embodiment of the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

According to various embodiments, the first wireless device 100 and/or one or more processors 102 may be configured to implement operations performed by the wireless device/UE in the present disclosure. For example, one or more processors 102 may be configured to identify a first resource for first data and a second resource for second data. The one or more processors 102 may be configured to control the transceiver 106 to transmit, to a second UE, control information for allocating the first resource and the first data based on the first resource. The control information may not include reservation information for the second resource indicating a location of the second resource based on a time interval between the first resource and the second resource being greater than a time interval allowed for resource reservation. The one or more processors 102 may be configured to identify a third resource for the second data in an active time of a discontinuous reception (DRX) cycle of the second UE based on the control information not including the reservation information for the second resource. The one or more processors 102 may be configured to control the transceiver 106 to transmit, to the second UE, control information for allocating the third resource and the second data based on the third resource.

According to various embodiments, the second wireless device 200 and/or one or more processors 202 may be configured to implement operations performed by a base station in the present disclosure. For example, one or more processors 202 may be configured to allocate a first resource and a second resource used for a transmission by a first UE to a second UE. The one or more processors 202 may be configured to control the transceiver 206 to transmit control information for scheduling the first resource and control information for scheduling the second resource to the first UE. The one or more processors 202 may be configured to control the transceiver 206 to receive, from the first UE, a resource request for requesting a resource used for the first UE to transmit to the second UE based on a time interval between the first resource and the second resource being greater than a time interval allowed for resource reservation. The one or more processors 202 may be configured to allocate a third resource used for a transmission by the first UE to the second UE in an active time of a discontinuous reception (DRX) cycle of the second UE based on the resource request. The one or more processors 202 may be configured to control the transceiver 206 to transmit control information for scheduling the third resource to the first UE.

Figure 18:
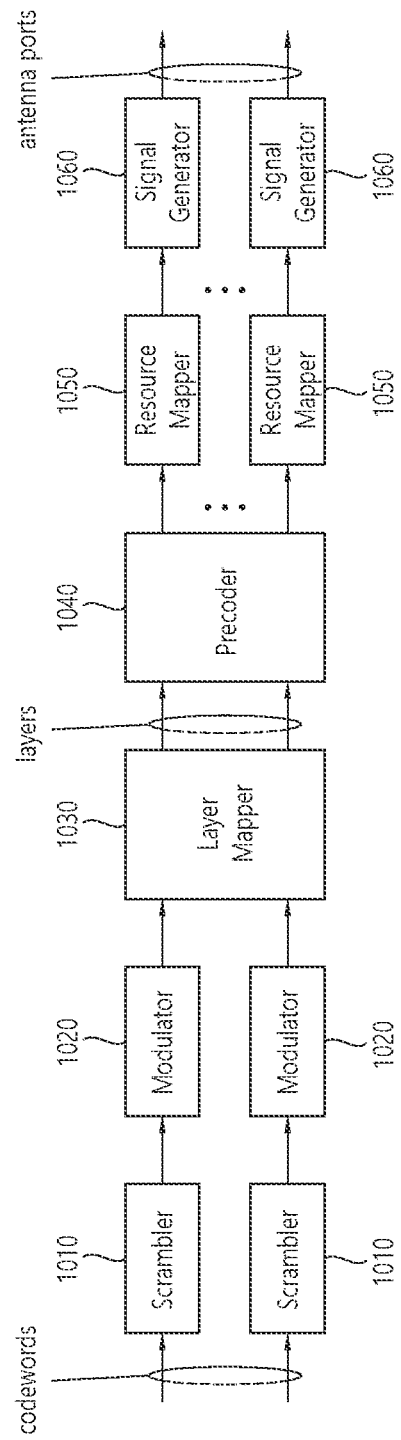
FIG. 18 shows a signal process circuit for a transmission signal, in accordance with an embodiment of the present disclosure.

FIG. 18 shows a signal process circuit for a transmission signal, in accordance with an embodiment of the present disclosure.

Referring to FIG. 18, a signal processing circuit 1000 may include scramblers 1010, modulators 1020, a layer mapper 1030, a precoder 1040, resource mappers 1050, and signal generators 1060. An operation/function of FIG. 18 may be performed, without being limited to, the processors 102 and 202 and/or the transceivers 106 and 206 of FIG. 17. Hardware elements of FIG. 18 may be implemented by the processors 102 and 202 and/or the transceivers 106 and 206 of FIG. 17. For example, blocks 1010 to 1060 may be implemented by the processors 102 and 202 of FIG. 17. Alternatively, the blocks 1010 to 1050 may be implemented by the processors 102 and 202 of FIG. 17 and the block 1060 may be implemented by the transceivers 106 and 206 of FIG. 17.

Codewords may be converted into radio signals via the signal processing circuit 1000 of FIG. 18. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 18. For example, the wireless devices (e.g., 100 and 200 of FIG. 17) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 19:
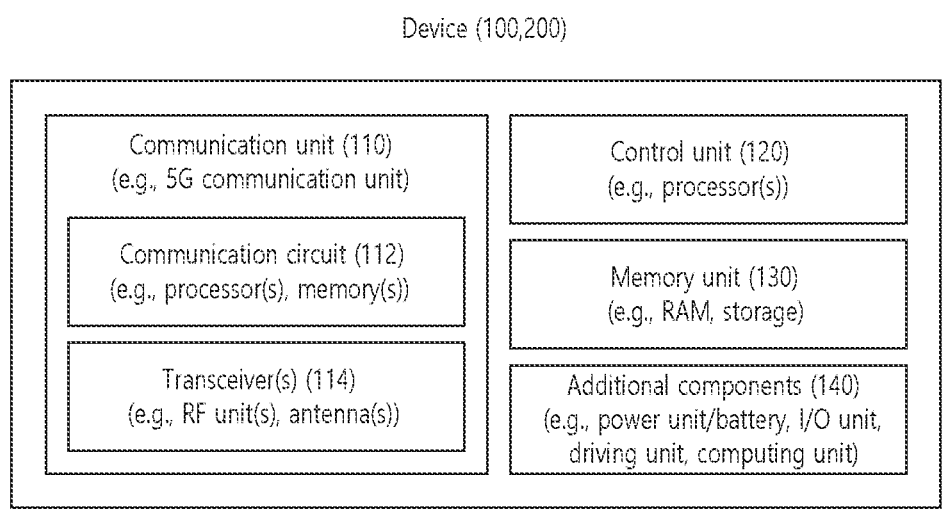
FIG. 19 shows another example of a wireless device, in accordance with an
embodiment of the present disclosure.

FIG. 19 shows another example of a wireless device, in accordance with an embodiment of the present disclosure. The wireless device may be implemented in various forms according to a use-case/service (refer to FIG. 16).

Referring to FIG. 19, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 16), the vehicles (100b-1 and 100b-2 of FIG. 16), the XR device (100c of FIG. 16), the hand-held device (100d of FIG. 16), the home appliance (100e of FIG. 16), the IoT device (100f of FIG. 16), a digital broadcast UE, a hologram device, a public safety device, an MTC device, a medicine device, a fintech device (or a finance device), a security device, a climate/environment device, the AI server/ device (400 of FIG. 16), the BSs (200 of FIG. 16), a network node, etc. The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 19 will be described in detail with reference to the drawings.

Figure 20:
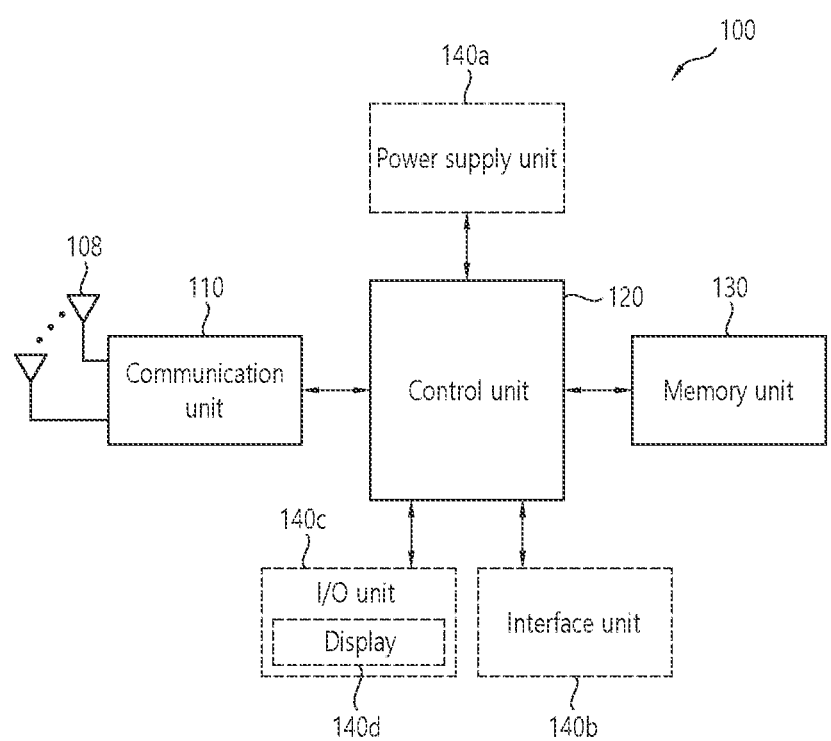
FIG. 20 shows a hand-held device, in accordance with an embodiment of the present disclosure.

FIG. 20 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user UE (UT), a Mobile Subscriber Station (MSS), a Subscriber Station (SS), an Advanced Mobile Station (AMS), or a Wireless UE (WT).

Referring to FIG. 20, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 19, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/ signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 21:
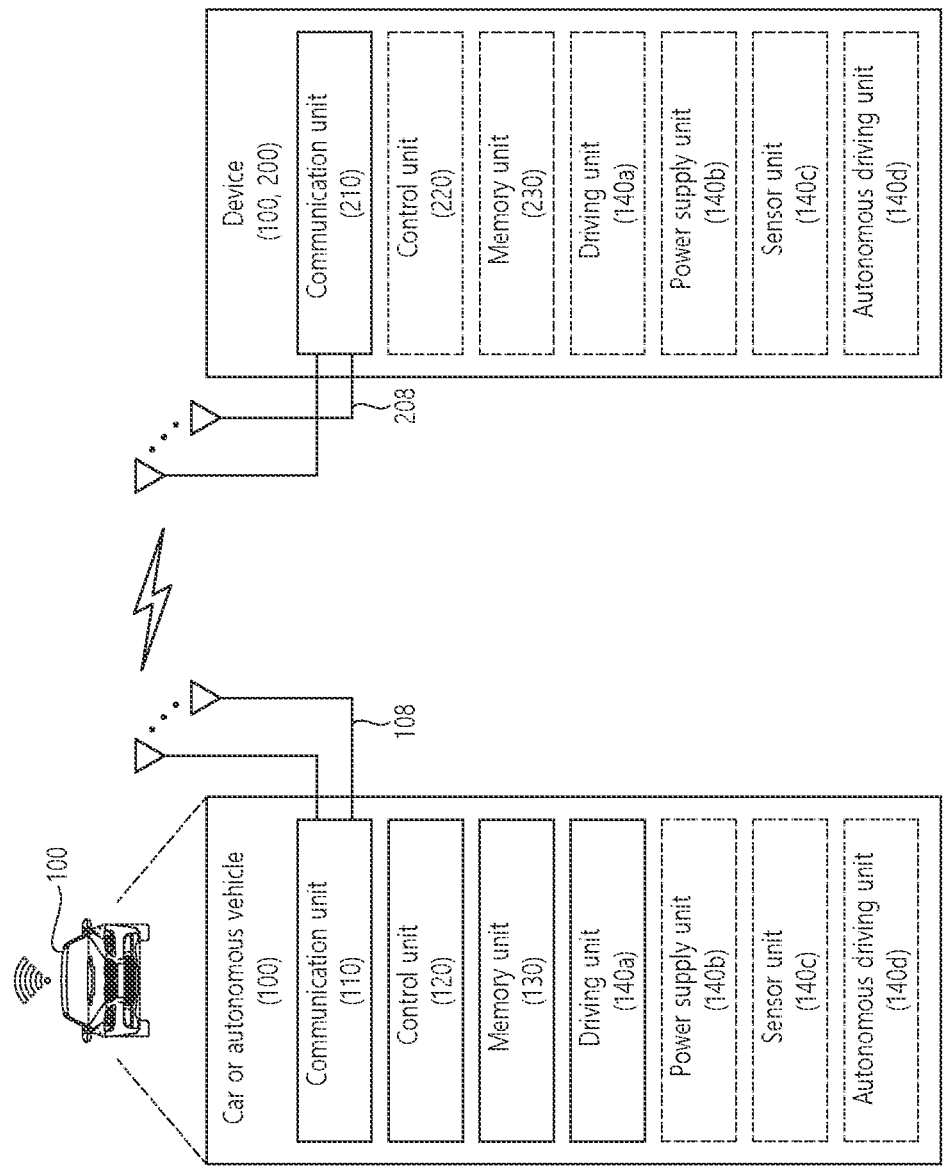
FIG. 21 shows a vehicle or an autonomous vehicle, in accordance with an embodiment of the present disclosure.

FIG. 21 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 21, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

The present disclosure may have various effects.

For example, even if the RX UE fails to receive data on the next transmission resource due to the time interval between the previous transmission resource and the next transmission resource being greater than the time interval allowed for resource reservation (e.g. 32 slots), the TX UE allocates resources again in DRX ON duration of RX UE, thereby it is possible to ensure that scheduling for RX is not interrupted.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method performed by a first user equipment (UE) in a wireless communication system, the method comprising:
    identifying a first resource for first data and a second resource for second data;
    transmitting, to a second UE, control information for allocating the first resource and the first data based on the first resource, wherein the control information does not include reservation information for the second resource indicating a location of the second resource based on a time interval between the first resource and the second resource being greater than a time interval allowed for resource reservation;
    identifying a third resource for the second data in an active time of a discontinuous reception (DRX) cycle of the second UE based on the control information not including the reservation information for the second resource; and
    transmitting, to the second UE, control information for allocating the third resource and the second data based on the third resource.

2. The method of claim 1, wherein the identifying of the first resource and the second resource comprises autonomously selecting the first resource and the second resource from a resource pool configured for the first UE.

3. The method of claim 1, wherein the identifying of the first resource and the second resource comprises receiving a sidelink grant for the first resource and a sidelink grant for the second resource from a network.

4. The method of claim 1, wherein the time interval allowed for resource reservation is 32 slots.

5. The method of claim 1, further comprising:
receiving information for the DRX cycle of the second UE from the second UE or a network,
wherein the information for the DRX cycle of the second UE comprises at least one of a time of the active time of the DRX cycle of the second UE, a length of the active time of the DRX cycle of the second UE, a time of the DRX cycle of the second UE, or a length of the DRX cycle of the second UE.

6. The method of claim 1, wherein the identifying of the third resource comprises:
transmitting a resource request for the third resource to a network based on a time interval between the first resource and the second resource being greater than a time interval allowed for resource reservation; and
in response to the resource request, receiving a sidelink grant for the third resource.

7. The method of claim 1, wherein the identifying of the third resource comprises autonomously selecting the third resource in an active time of the DRX cycle of the second UE based on a time interval between the first resource and the second resource being greater than a time interval allowed for resource reservation, and
wherein the third resource is selected from a resource pool configured for the first UE.

8. The method of claim 1, wherein the second data corresponds to retransmission of the first data.

9. The method of claim 1, wherein the location of the second resource belongs to an inactive time of the DRX cycle of the second UE.

10. The method of claim 1, wherein the time interval allowed for resource reservation is greater than or equal to a time interval in which an active time of the DRX cycle of the second UE lasts from when transmission related to the second UE occurs.

11. The method of claim 1, wherein the control information for allocating the first resource includes information indicating that the second data to be transmitted exists.

12. The method of claim 1, wherein the reservation information for the second resource is used to increase the active time of the DRX cycle of the second UE so that the active time of the DRX cycle of the second UE includes the location of the second resource.

13. The method of claim 1, wherein the first UE and the second UE are autonomous vehicles that perform vehicle-to-everything (V2X) communication with each other.

14. A first user equipment (UE) in a wireless communication system, the first UE comprising:
a transceiver;
a memory; and
at least one processor operatively coupled to the transceiver and the memory,
wherein the at least one processor is configured to:
identify a first resource for first data and a second resource for second data;
control the transceiver to transmit, to a second UE, control information for allocating the first resource and the first data based on the first resource, wherein the control information does not include reservation information for the second resource indicating a location of the second resource based on a time interval between the first resource and the second resource being greater than a time interval allowed for resource reservation;
identify a third resource for the second data in an active time of a discontinuous reception (DRX) cycle of the second UE based on the control information not including the reservation information for the second resource; and
control the transceiver to transmit, to the second UE, control information for allocating the third resource and the second data based on the third resource.

15. A base station (BS) in a wireless communication system, the BS comprising:
a transceiver;
a memory; and
at least one processor operatively coupled to the transceiver and the memory,
wherein the at least one processor is configured to control the transceiver to:
allocate a first resource and a second resource used for a transmission by a first user equipment (UE) to a second UE;
control the transceiver to transmit control information for scheduling the first resource and control information for scheduling the second resource to the first UE;
control the transceiver to receive, from the first UE, a resource request for requesting a resource used for the first UE to transmit to the second UE based on a time interval between the first resource and the second resource being greater than a time interval allowed for resource reservation;
allocate a third resource used for a transmission by the first UE to the second UE in an active time of a discontinuous reception (DRX) cycle of the second UE based on the resource request; and
control the transceiver to transmit control information for scheduling the third resource to the first UE.

* * * * *